United States Patent
Taoka et al.

(10) Patent No.: US 7,185,986 B2
(45) Date of Patent: Mar. 6, 2007

(54) PROJECTION TYPE VIDEO DISPLAY APPARATUS, LIGHT DEFLECTION DEVICE IN PROJECTION TYPE VIDEO DISPLAY APPARATUS, AND DIRECT-VIEW TYPE VIDEO DISPLAY APPARATUS

(75) Inventors: Mineki Taoka, Higashiosaka (JP); Toshiya Iinuma, Kyoto (JP); Kazuhiro Arai, Daito (JP); Yoshihiro Yokote, Hirakata (JP); Haruhiko Murata, Ibaraki (JP); Hideyuki Kanayama, Uji (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/808,614

(22) Filed: Mar. 25, 2004

(65) Prior Publication Data
US 2005/0036075 A1 Feb. 17, 2005

(30) Foreign Application Priority Data
Mar. 25, 2003 (JP) .............................. 2003-083485

(51) Int. Cl.
*G03B 21/14* (2006.01)
*G02F 1/00* (2006.01)
*G02F 1/1335* (2006.01)

(52) U.S. Cl. ........................... 353/31; 353/81; 353/88; 348/756; 349/7; 349/62

(58) Field of Classification Search ................. 353/30, 353/31, 28, 82–90, 94, 97, 122, 121, 81; 349/81, 77, 78, 61, 7, 62; 348/756
See application file for complete search history.

(56) References Cited

U.S. PATENT DOCUMENTS

| 6,288,815 | B1 * | 9/2001 | Lambert ...................... 359/196 |
| 6,843,567 | B2 * | 1/2005 | Lee et al. ...................... 353/31 |
| 6,877,860 | B2 * | 4/2005 | Cho et al. ...................... 353/31 |
| 2003/0007134 | A1 * | 1/2003 | Maximus ...................... 353/31 |
| 2003/0227465 | A1 * | 12/2003 | Morgan et al. ............. 345/589 |

FOREIGN PATENT DOCUMENTS

| JP | 09-325715 | 12/1997 |
| JP | 9-325715 | 12/1997 |
| JP | 2001-235720 | 8/2001 |
| JP | 2001-255508 | 9/2001 |
| JP | 2002-6815 | 1/2002 |
| JP | 2002-148712 | 5/2006 |

OTHER PUBLICATIONS

Japanese Office Action dated Jul. 27, 2006.
* cited by examiner

*Primary Examiner*—W. B. Perkey
*Assistant Examiner*—Andrew Sever
(74) *Attorney, Agent, or Firm*—McDermott Will & Emery LLP

(57) ABSTRACT

In a projection type video display apparatus comprising means for circularly scrolling and irradiating irradiated light in a direction perpendicular to the line direction on a hold-type display panel, a projection type video display apparatus comprises means for varying overdrive in conformity with the timing of irradiation of the irradiated light.

4 Claims, 29 Drawing Sheets

T01
T02
T03
T11
T12
T13
T21
T22
T23

↓
TIME

→
EYE MOVEMENT

POSITION OF EYE
FOR EACH MOVEMENT $$I(t) = \int_{t=T}^{t=T+\tau} i(t)dt$$

$$I(t) = \int_{t=T}^{t=T+\tau} i(t)dt$$

$$I(t) = \int_{t=T}^{t=T+\tau} i(t)dt$$

FRAME PERIOD

FIG. 22
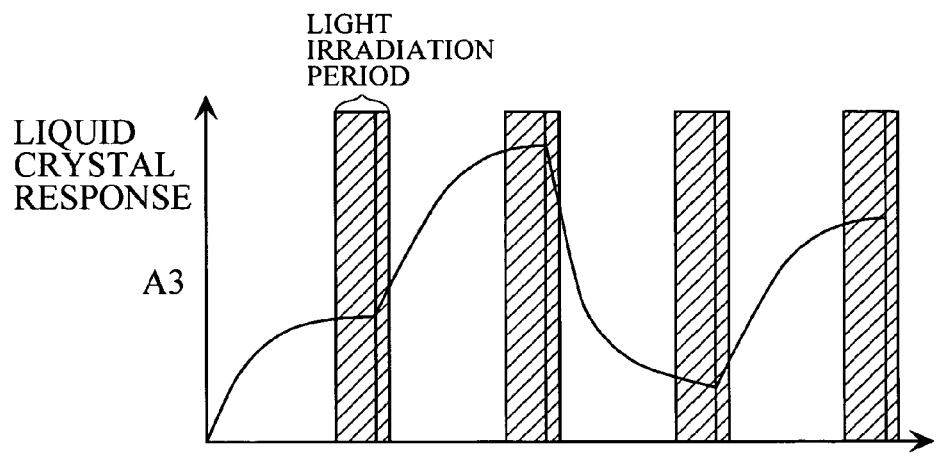
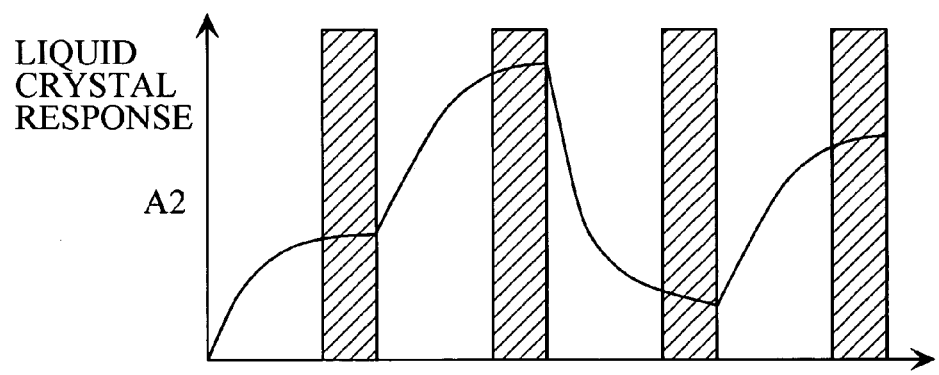
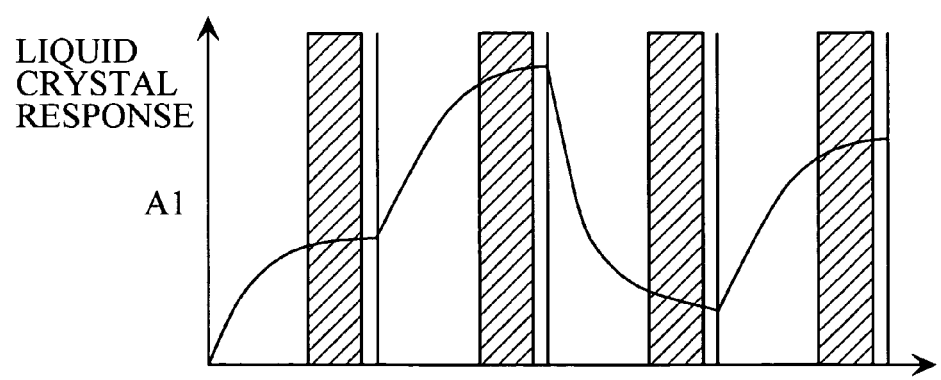

PROJECTION TYPE VIDEO DISPLAY APPARATUS, LIGHT DEFLECTION DEVICE IN PROJECTION TYPE VIDEO DISPLAY APPARATUS, AND DIRECT-VIEW TYPE VIDEO DISPLAY APPARATUS

BACKGROUND OF THE INVENTION

1. Field of the Invention

The present invention relates to a projection type video display apparatus, a light deflection device in the projection type video display apparatus, and a direct-view type video display apparatus.

2. Description of the Background Art

Displays such as a liquid crystal display panel (LCD) a digital micromirror device (DMD), and a plasma display panel (PDP) are referred to as hold-type displays. The reason for this is that in a case where an electric signal a in a rectangular pulse shape is inputted, a light signal c in an impulse shape is outputted in a cathode ray tube (CRT), while the luminance of a displayed image is held over one frame period, as represented by a light signal b, in the LCD, DMD, and PDP, as shown in FIG. 1. In such hold-type displays, when a moving image is displayed, the image becomes unclear, unlike that in the CRT.

Conventionally, it has been considered that degradation in image quality which occurs when the moving image is displayed on the hold-type display is caused by the fact that the response speed of the display device is low. With recent advances in visual studies, however, it has been found that predetermined degradation in image quality cannot be avoided even if the response speed of the display device is improved, resulting in instantaneous response. Such degradation in image quality is referred to as "Hold Blurring".

The "Hold Blurring" is caused by an accumulation effect in the visual information processing system of human beings, and is a phenomenon which does not occur in impulse output type display devices such as the CRT, as shown in FIG. 2. A human being pursues an object in the moving image with his or her eyes in observing the moving image. At this time, the follow-up speed of the eyeball cannot be rapidly changed, so that the moving image moves at a substantially constant speed in a normal refresh period (17 ms) of the moving image. In the hold-type display, however, the same video is outputted in a predetermined period (17 ms: T01~T03, T11~T13, T21~T23) at the same position, as shown in FIGS. 3 and 4a. Therefore, the displayed video retreats relative to the position of the eye, so that an image with retreat movement is projected on the retina, as shown in FIGS. 4b and 5a.

However, this occurs in the preceding stage of the visual information processing system. Therefore, the speed actually recognized is sufficiently lower than 17 ms. Images are accumulated in a predetermined period, as shown in FIG. 5b, and an image obtained by the accumulation is recognized as a visual sense. As a result, the recognized image is such a blurred image that tracks which moved on the retina in a predetermined period are overlapped with each other. The period of the accumulation is known as the Bloch theorem, and is said to be approximately 50 ms to 80 ms.

On the other hand, in the case of the CRT, videos outputted for a moment are only accumulated, as shown in FIGS. 6a and 6b. Even if the accumulation is performed by follow-up, an image returned to the eye is not projected on the retina, so that a clear image is recognized.

The most general method for improving the "Hold Blurring" is to bring electro-optic conversion characteristics near to the characteristics of the CRT. Since the electro-optic conversion characteristics of the CRT are impulse-type conversion characteristics, the above-mentioned problem does not arise. The most effective method for improving the moving image display characteristics of the hold-type display is to perform intermittent display by intermittently irradiating light onto a display device such as a liquid crystal or a DMD, as shown in FIGS. 7a and 7b (see JP-A-09-325715: IPC G09F 9/35).

When light is intermittently irradiated onto the display device, however, an irradiation time period is restricted to approximately 60%. Accordingly, the luminance of the display device is also lowered to 60%. Further, it can hardly be said that the restriction of the irradiation time period to 60% is not sufficient as an improvement of degradation in image quality due to hold failure. It goes without saying that the shorter the irradiation time period becomes, the better the effect of the improvement becomes. However, the rise in costs becomes a great problem. For example, a bright backlight is required. Further, a power supply or the like increases in size.

Such a method is difficult to realize in a liquid crystal projector using a high output projection lamp. Flashing of the projection lamp heavily damages the projection lamp, and adversely affects the life thereof. In a case where light is shuttered, the problem of radiation also arises because a large part of the shuttered light is changed into heat.

As to a liquid crystal projector, a method of scrolling light on a panel by a condenser mirror is disclosed (see JP-A-2002-6815: G09G 3/36). Since light is scrolled by reflection in a light condensing system (a polygonal mirror) disclosed herein, however, an optical system significantly increases in size in a case where the projector is constructed.

Already developed as a direct-view type liquid crystal display is one in which a liquid crystal display panel is divided into a plurality of division areas in the vertical direction, a backlight is provided for each of the division areas, and ON/OFF of the backlight is controlled, so that light from the backlight is circularly scrolled and irradiated for each of the division areas on the liquid crystal display panel downward from the top thereof (see JP-A-2001-235720: IPC G02F 1/133).

The applicant of the present invention has already developed a liquid crystal projector capable of improving degradation in image quality in displaying a moving image which is referred to as "Hold Blurring" by scrolling light on a liquid crystal display device (a hold-type display device) in an optical system which can be miniaturized. Description is now made of a first liquid crystal projector and a second liquid crystal projector (which have not been laid open to public yet) already developed by the applicant of the present invention.

FIG. 8 illustrates the configuration of the first liquid crystal projector already developed by the applicant of the present invention.

A light source (a projection lamp) 1 is composed of an extra-high pressure mercury lamp, a metal halide lamp, a xenon lamp, or the like. A light condensing unit 2 is composed of an elliptical mirror, a combination of a parabolic mirror and a condenser lens, or the like, for receiving light emitted from the light source 1 and reflecting the received light. The light condensed in the light condensing unit 2 is incident on an integrator (a rod prism) 3, and is emitted as a uniform surface light source after total reflection thereof is repeated on its inner surface.

Light obtained by integration is emitted toward a light scrolling disc 4 which is light deflection means. The details of the light scrolling disc 4 will be described later. A relay lens optical system 5 causes light deflected by the light scrolling disc 4 to be incident, and transmits an image to a color separation dichroic prism 6a in a video light generation system 6. Light incident on the color separation dichroic prism 6a is separated into R (Red), G (Green), and B (Blue) lights, and the lights are respectively introduced into a liquid crystal display panel for R color 7R, a liquid crystal display panel for G color 7G, and a liquid crystal display panel for B color 7B.

The light scrolling disc 4 is in a disc shape, and comprises a light transmission portion (transparent portion) 41 in a spiral shape and the other light non-transmission portion 42, as shown in FIG. 9. A portion, facing the integrator 3, of the non-transmission portion 42 is formed into a mirror surface on which light is reflected.

The light scrolling disc 4 is rotated in a direction indicated by an arrow A (in a counterclockwise direction as viewed from the integrator 3) by a motor 11 with its center used as an axis of rotation. Light obtained by integration is incident on an inner part of a frame indicated by a chained line S in FIG. 9 on the light scrolling disc 4. The light incident on the light scrolling disc 4 is emitted only from the light transmission portion (transparent portion) 41. Therefore, the light emitted from the light scrolling disc 4 has a circular arc shape.

When the light scrolling disc 4 is rotated in the direction indicated by the arrow A (in the counterclockwise direction as viewed from the integrator 3), the circular arc-shaped light emitted from the light scrolling disc 4 (the light irradiated onto each of the liquid crystal display panels 7R, 7G, and 7B) is repeatedly changed, for example, scrolled downward from the top of the liquid crystal display panel, as shown in FIG. 10. In this case, the circular arc-shaped light irradiated onto each of the liquid crystal display panels 7R, 7G, and 7B has such a circular arc shape which is an inverted U shape that its center is positioned above both its ends.

When a portion, on which light is incident, of the light scrolling disc 4 is set as indicated by S in FIG. 11, and the light scrolling disc 4 is rotated as indicated by an arrow B, the circular arc-shaped light emitted from the light scrolling disc 4 (the light irradiated onto each of the liquid crystal display panels) is repeatedly changed, for example, scrolled downward from the top of the liquid crystal display panel, as shown in FIG. 12. In this case, the circular arc-shaped light irradiated onto each of the liquid crystal display panels 7R, 7G, and 7B has such a circular arc shape which is a U shape that its center is positioned below both its ends.

The lights in colors respectively incident on the liquid crystal display panels 7R, 7G, and 7B are modulated depending on the degrees of light transmission of liquid crystals of corresponding pixels on the panel, video lights in the colors obtained by the modulation are synthesized in a color synthesis dichroic prism 6b to be color video light, and the color video light is projected on a screen 9 by a projection lens 8.

The circular arc-shaped illuminating lights in the respective colors are thus circularly scrolled on the liquid crystal display panel 7, so that only a part of a frame period is displayed, and the remaining period becomes black when one pixel on the panel is paid attention to. As a result, intermittent display is realized, thereby improving blurring in a case where a moving image is displayed. For example, a case where an irradiation area of circular arc-shaped light is set to one-third the whole of a panel (a screen) is equivalent to such intermittent display that one-third of a frame period is displayed and two-thirds of the frame period is not displayed, as shown in FIGS. 13a, 13b, and 13c.

A signal processing system will be then described. A panel driving unit (panel writing means) 15 drives each of the liquid crystal display panels 7R, 7G, and 7B on the basis of an inputted video signal. That is, a device driving voltage for setting the degree of light transmission of each of pixels composing each of the liquid crystal display panels is generated on the basis of the video signal, and is fed to the pixel. A synchronization separation circuit 14 extracts a vertical synchronizing signal from the video signal, and feeds the extracted vertical synchronizing signal to a scroll phase detection unit 12. The scroll phase detection unit 12 detects a phase difference from a rotation period of the light scrolling disc 4 and vertical synchronization.

Information related to the rotation period of the light scrolling disc 4 can be obtained by a rotary encoder, for example. A rotation control unit 13 for controlling the rotation of the motor 11 receives a signal representing the above-mentioned phase difference from the scroll phase detection unit 12, to carry out control such that the rotation period of the light scrolling disc 4 coincides with the vertical synchronization. The contents of the control are illustrated in FIG. 14. A supply voltage to the motor 11 (or the number of pulses, the pulse width, etc.) is increased in order to increase the rotational speed if the rotation period is later than the vertical synchronization, is reduced in order to reduce the rotational speed if the rotation period is earlier than the vertical synchronization, and is not changed if the rotation period coincides with the vertical synchronization.

There is no problem if the response speed of the liquid crystal display panel is high. Since a sufficient response speed cannot be obtained in the normal liquid crystal display panel, however, the response of a pixel (the response of a liquid crystal of the pixel) is not completed in a period during which scrolled light is irradiated. When the response of the pixel is not thus completed, a luminance value corresponding to image data is not obtained.

Therefore, the subsequent frame data is written into a pixel immediately after irradiated light is scrolled, as shown in FIG. 15. When the response characteristics of a liquid crystal are as shown in FIG. 16, light irradiation is performed in a period Ta including the time point where the response of the liquid crystal is completed. That is, the timings of liquid crystal response and display (panel illumination) are set, as shown in FIG. 17.

FIG. 18 illustrates the configuration of a second liquid crystal projector already developed by the applicant of the present invention.

In a liquid crystal display panel used for a normal liquid crystal projector, response is not completed in one frame period (a period of 17 ms). Even at the timing of writing into a frame, therefore, an image corresponding to a frame which is two frames preceding the current frame remains on the liquid crystal display panel, so that a double image is always displayed throughout the whole period. When intermittent display by scrolling of irradiated light is performed using such a panel, the double image is emphasized. As a result, such an impression that the image quality is improved is not obtained.

In the second liquid crystal projector, therefore, overdrive control is carried out for writing data into the liquid crystal display panel to realize response in the period of 17 ms, thereby reducing the double image. In the liquid crystal projector, it is assumed that in a case where an attempt to change an input value from "100" to "200" is made, for example, a liquid crystal only responds until the degree of transmission thereof corresponds to "180" within a writing period. In such a case, suppose the input value is set to not "200" but "230", for example. In this case, if the liquid crystal only responds until the degree of transmission thereof corresponds to "200" within the writing period, the input value "200" may be replaced with the input value "230". To emphasize the input value such that the degree of transmission of the liquid crystal reaches the target degree of transmission earlier is referred to as overdrive control.

FIG. 19a illustrates liquid crystal response in a case where overdrive control is not carried out, and FIG. 19b illustrates liquid crystal response in a case where overdrive control is carried out. That is, when overdrive control is carried out, the input value is emphasized such that the degree of transmission of the liquid crystal reaches the target degree of transmission, as indicated by hatching in FIG. 19b. As a result, the degree of transmission of the liquid crystal reaches the target degree of transmission within a period of 17 ms, thereby making it possible to reduce the double image.

In the second liquid crystal projector, overdrive control is carried out in an overdrive control circuit 20 such that a liquid crystal response state is as illustrated in FIG. 19b. Overdrive control is for compensating for delay in the response by emphasizing the input value corresponding to the liquid crystal display panel.

FIG. 20 mainly illustrates the configuration of the overdrive control circuit 20.

The overdrive control circuit 20 comprises a counter 21, video input means 22, overdrive processing means 23, a frame memory 24, and an overdriving table 25.

A synchronizing signal (vertical and horizontal synchronizing signals) is inputted to the counter 21, and signals corresponding to horizontal and vertical positions of a pixel corresponding to an input signal are outputted thereto. The signals are fed to the video input means 22 and the panel driving unit 15.

A video signal is inputted to the video input means 22. The video signal inputted to the video input means 22 is fed to the frame memory 24 as well as the overdrive processing means 23. The frame memory 24 is for holding a video signal corresponding to a frame which is one frame preceding the current frame.

The overdriving table 25 holds, for each estimated combination of an input value in the preceding frame and an input value in the current frame, which correspond to the same pixel, an output value at which the input value in the current frame is emphasized. The output value is set such that an amount of change between the input value in the preceding frame and the output value is larger, as compared with an amount of change between the input value in the preceding frame and the input value in the current frame. The same table data is used with respect to input signals respectively corresponding to pixels.

The overdrive processing means 23 reads, when a pixel value corresponding to the predetermined pixel is inputted from the video input means 22, an input value in the preceding frame, which corresponds to the pixel, from the frame memory 24. On the basis of the input value in the preceding frame and an input value in the current frame, which correspond to the pixel, an output value corresponding to the combination of the input values is read from the overdriving table 25, and the obtained output value is outputted to the panel driving unit 15.

In a case where the light scrolling disc 4 is driven by the method described using FIG. 9, to scroll light irradiated onto the liquid crystal display panel, the irradiated light L has a circular arc shape which is an inverted U shape, as shown in FIG. 21. Therefore, the pixels on the same horizontal line differ in timing at which light is irradiated thereonto depending on the positions thereof in the horizontal direction. An arrow W in FIG. 21 indicates the order in which data are written.

As described in the foregoing, a light irradiation period most suitable for liquid crystal response becomes a period indicated by Ta in FIG. 16. As shown in FIG. 22, when the timing of light irradiation is adjusted so as to be timing most suitable for the response of a liquid crystal of a pixel A3 at the center illustrated in FIG. 21, the farther a pixel is away from the pixel A3 in the horizontal direction, the earlier the timing of light irradiation becomes, as compared with the timing of light irradiation most suitable for the response of a liquid crystal of the pixel. Therefore, the farther the pixel is away from the pixel A3 in the horizontal direction, the more easily a double image is produced.

As shown in FIG. 23, even in a direct-view type video display apparatus in which a liquid crystal display panel is divided into a plurality of division areas S1 to S5 in the vertical direction, a backlight is provided for each of the division areas S1 to S5, and ON/OFF of the backlight is controlled, so that light from the backlight is circularly scrolled and irradiated for each of the division areas on the liquid crystal display panel downward from the top thereof.

As shown in FIG. 24, consider pixels B1, B2, and B3 which differ in positions in the vertical direction in the division area where the backlight on the liquid crystal display panel lights up. Although the timings of irradiation onto the pixels B1, B2, and B3 are the same, data are written into the pixels B1, B2, and B3 in this order. Accordingly, the timings of data writing into the pixels differ, so that the timings of completion of the response of liquid crystals of the pixels differ.

As shown in FIG. 25, when the timing of light irradiation is adjusted so as to be timing most suitable for the response of a liquid crystal of a pixel B1, the farther a pixel is away from the pixel B1 in the vertical direction, the earlier the timing of light irradiation becomes, as compared with the timing of light irradiation most suitable for the response of a liquid crystal of the pixel. Therefore, the farther the pixel is away from the pixel B1 in the vertical direction, the more easily a double image is produced.

SUMMARY OF THE INVENTION

An object of the present invention is to provide, in a projection type video display apparatus so adapted as to scroll irradiated light in a circular arc shape which is an inverted U shape on a hold-type display panel, a projection type video display apparatus capable of reducing a double image.

Another object of the present invention is to provide, in a direct-view type video display apparatus in which a hold-type display panel is divided into a plurality of division areas in the vertical direction, a backlight is provided for each of the division areas, and ON/OFF of the backlight is controlled, so that light from the backlight is circularly scrolled and irradiated for each of the division areas on the hold-type display panel downward from the top thereof, a direct-view type video display apparatus capable of reducing a double image.

Still another object of the present invention is to provide a light deflection device in a projection type video display apparatus, in which a double image can be prevented from being produced.

In a projection type video display apparatus comprising light deflection means for circularly scrolling and irradiating irradiated light in a direction perpendicular to the line direction on a hold-type display panel, a first projection type video display apparatus according to the present invention is characterized by comprising means for varying overdrive in conformity with the timing of irradiation of the irradiated light.

In a projection type video display apparatus comprising light deflection means for circularly scrolling and irradiating irradiated light with a pattern having a circular arc shape which is an inverted U shape in a direction, perpendicular to the line direction, in which the writing of data progresses on a hold-type display panel, a second projection type video display apparatus according to the present invention is characterized by comprising by-area overdrive control means for taking overdrive control for emphasizing an input value which is carried out with respect to an input signal corresponding to an area at the center of the width of the hold-type display panel as reference overdrive control, to carry out by-area overdrive control, in which the farther an area is away from the center of the width of the hold-type display panel in the horizontal direction, the higher the degree of emphasis of an input value is made, as compared with that in the reference overdrive control, with respect to an input signal corresponding to the area.

In a direct-view type video display apparatus in which a hold-type display panel is divided into a plurality of division areas in the vertical direction, a backlight is provided for each of the division areas, and ON/OFF of the backlight is controlled, so that light from the backlight is circularly scrolled and irradiated in the vertical direction, in which the writing of data progresses, for each of the division areas on the hold-type display panel, a direct-view type video display apparatus according to the present invention is characterized by comprising by-area overdrive control means for taking, in each of the division areas on the hold-type display panel, overdrive control for emphasizing an input value which is carried out with respect to an input signal corresponding to an uppermost area in the division area as reference overdrive control, to carry out by-area overdrive control, in which the farther an area is away from the uppermost area in the vertical direction in the division area, the higher the degree of emphasis of an input value is made, as compared with that in the reference overdrive control, with respect to an input signal corresponding to the area.

In a light deflection device in a projection type video display apparatus, a light deflection device in a projection type video display apparatus according to the present invention is characterized by comprising a light scrolling disc arranged on an optical path of emitted light from a light source for projection; and a driving device for rotating the light scrolling disc around its center, the light scrolling disc comprising a spiral-shaped light transmission portion and other light interruption portion, the position where the emitted light from the light source for projection is inputted to the light scrolling disc and the direction of rotation of the light scrolling disc being determined such that the shape of light passing through the light transmission portion in the light scrolling disc is a pattern in a circular arc shape which is an inverted U shape, and light with the pattern is circularly scrolled in a direction, perpendicular to the line direction, in which the writing of data progresses on a hold-type display panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a schematic view showing that in a case where the timing of light irradiation is adjusted so as to be timing most suitable for the response of a liquid crystal of a pixel A3 at the center illustrated in FIG. 21, the farther a pixel is away from the pixel A3 in the horizontal direction, the earlier the timing of light irradiation becomes, as compared with the timing of light irradiation most suitable for the response of a liquid crystal of the pixel;

DETAILED DESCRIPTION OF PREFERRED EMBODIMENT

Description is now made of an embodiment of the present invention

[1] Description of Basic Idea of Present Invention

Figure 1:
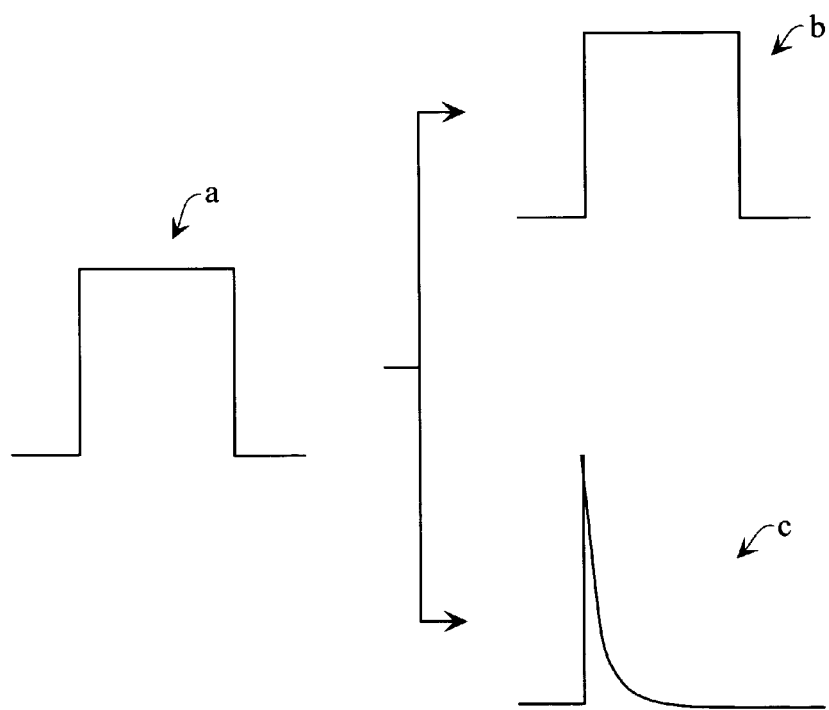
FIG. 1 is a schematic view showing the electro-optic conversion characteristics of a CRT and a hold-type display device.
Figure 2:
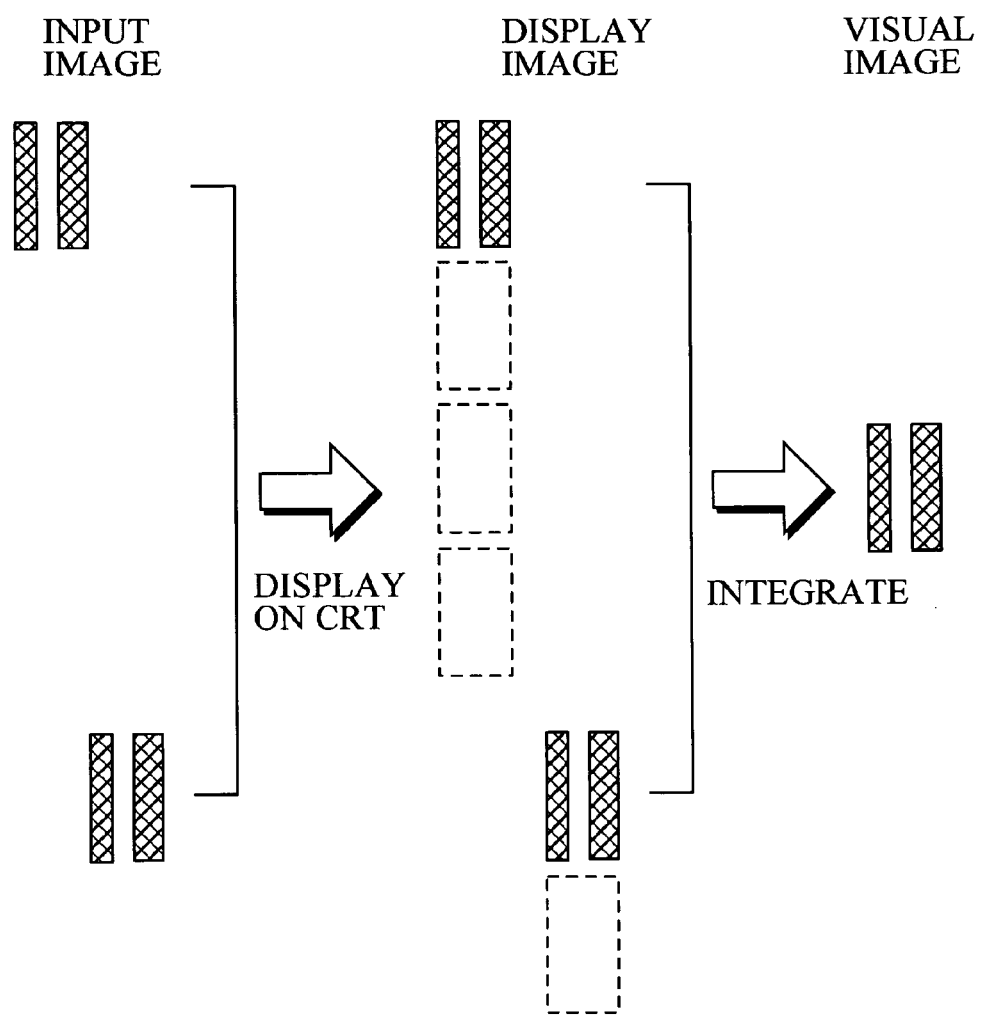
FIG. 2 is a schematic view showing a display image in a CRT and visibility.
Figure 3:
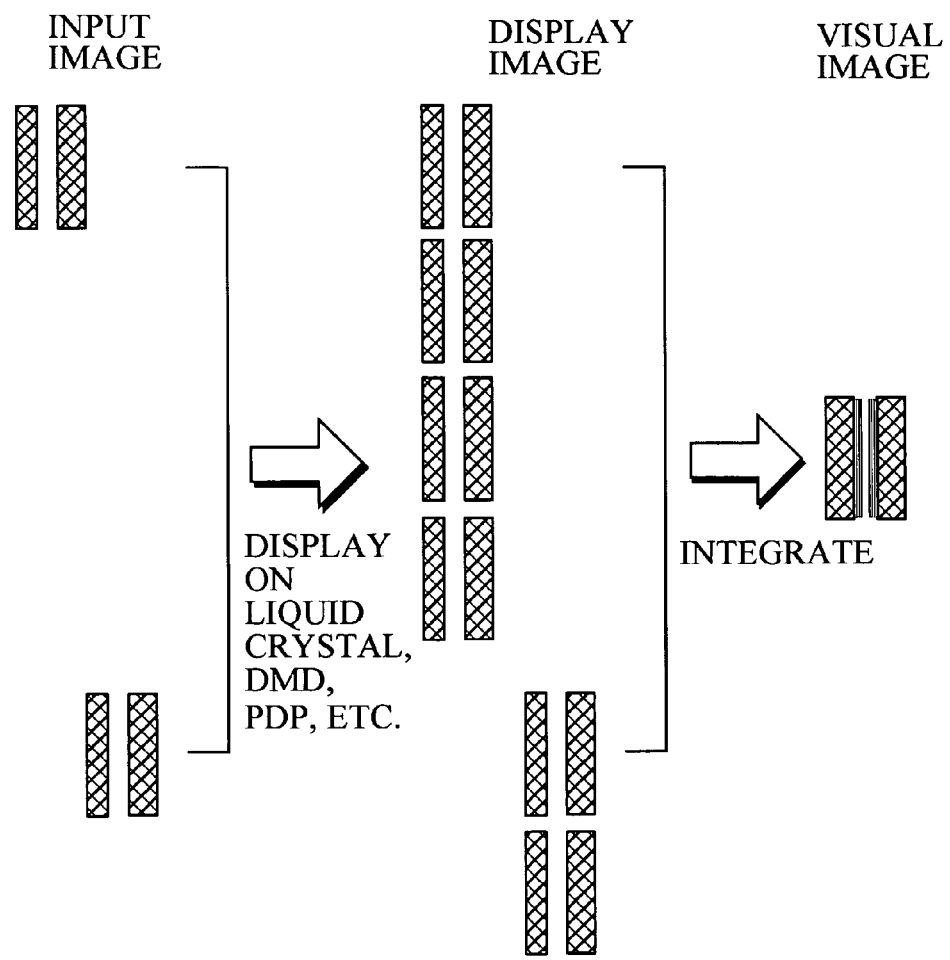
FIG. 3 is a schematic view showing a display image in a hold-type display device and visibility.
Figure 4A:
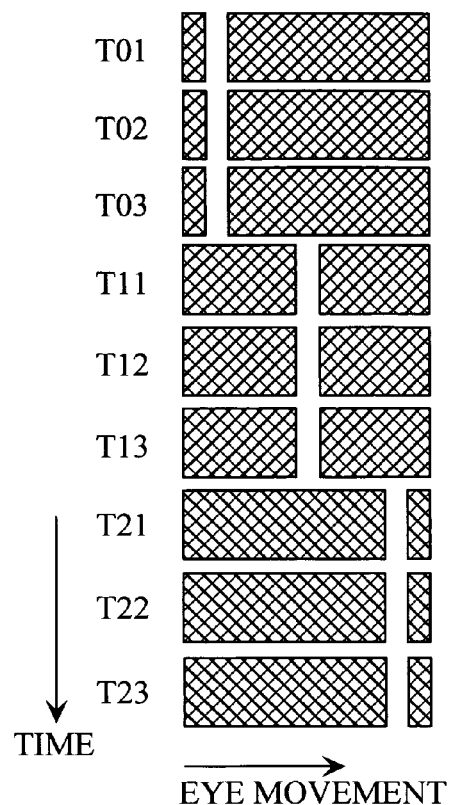
FIGS. 4a and 4b are schematic views for explaining the production of a double image in a hold-type display device.
Figure 4B:
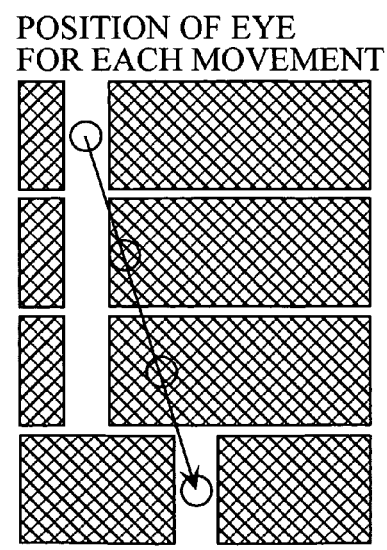
Figure 5A:
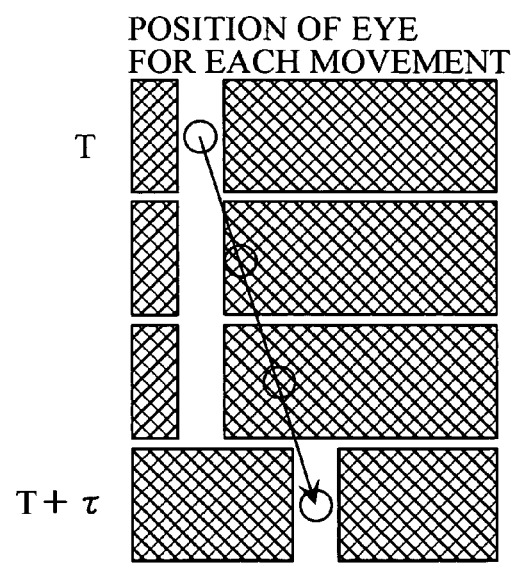
FIGS. 5a and 5b are schematic views for explaining the production of a double image in a hold-type display device.
Figure 5B:
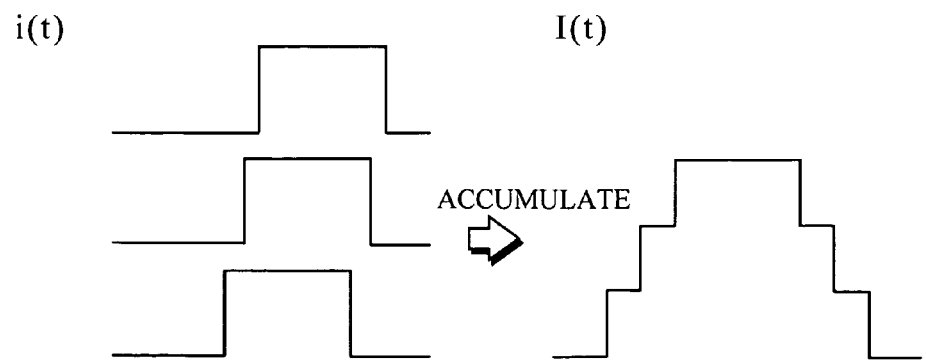
Figure 6A:
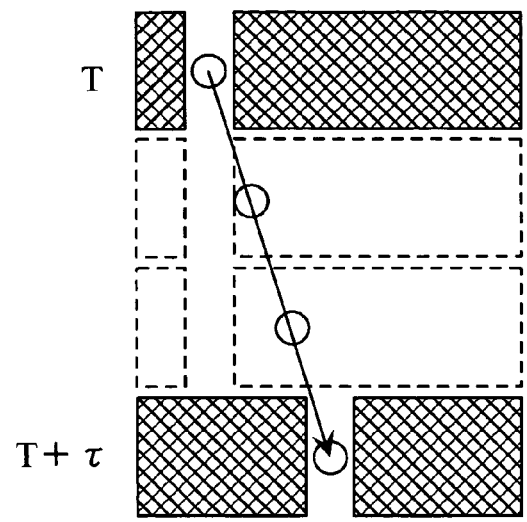
FIGS. 6a and 6b are schematic views for explaining that a double image is not produced in a CRT.
Figure 6B:
Figure 7A:
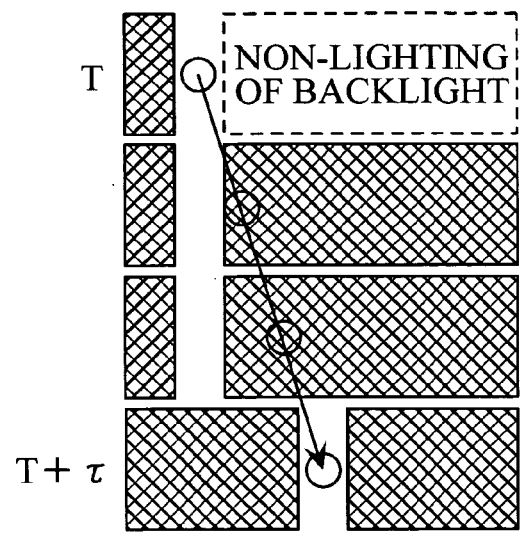
FIGS. 7a and 7b are schematic views showing that a double image is reduced by intermittently irradiating light onto a hold-type display device.
Figure 7B:
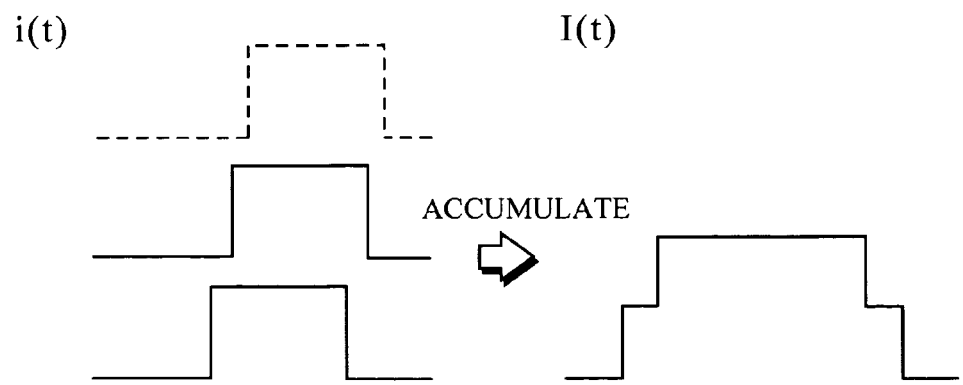
Figure 8:
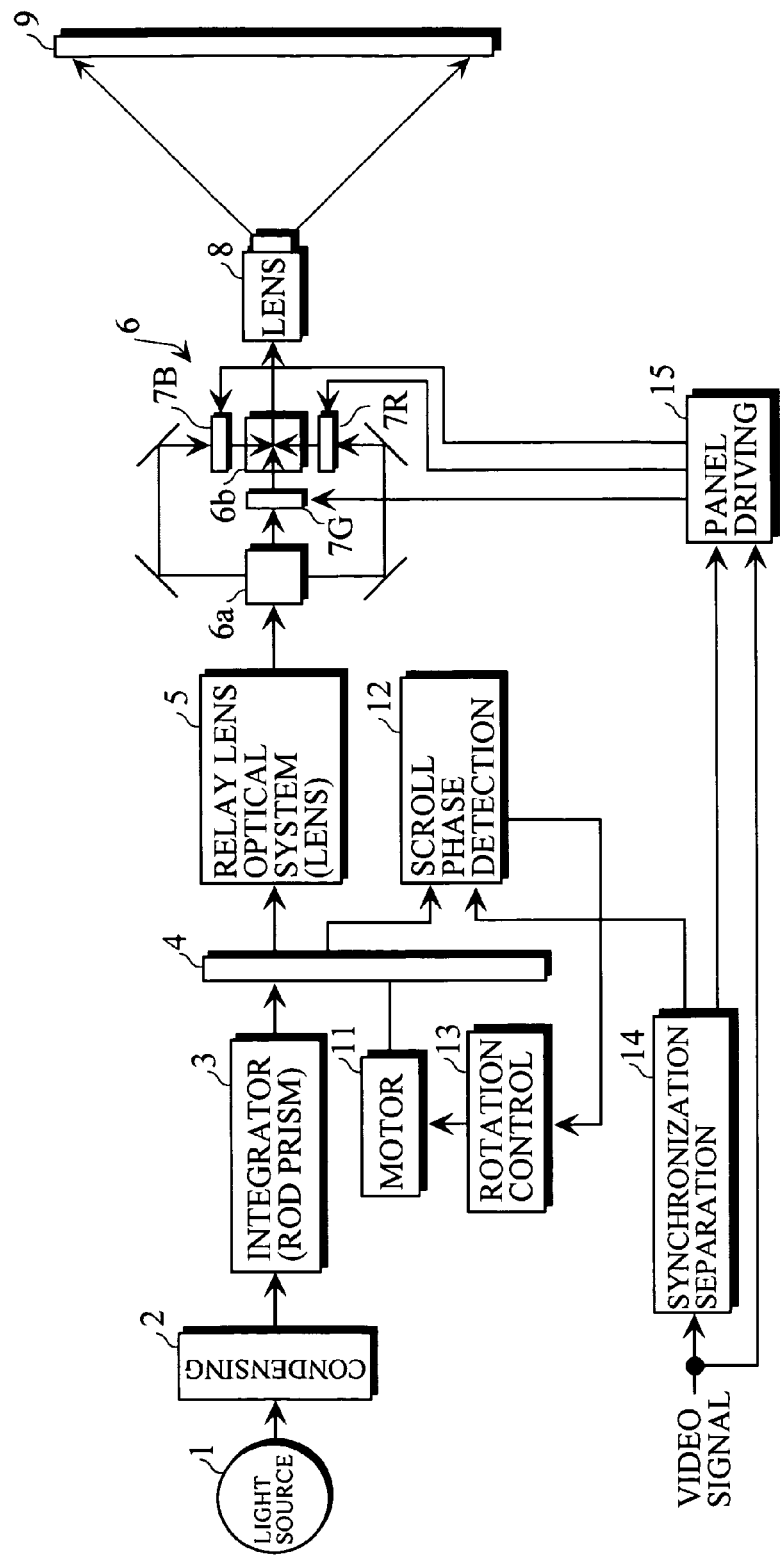
FIG. 8 is a block diagram showing the configuration of a first liquid crystal projector already developed by the applicant of the present invention.
Figure 9:
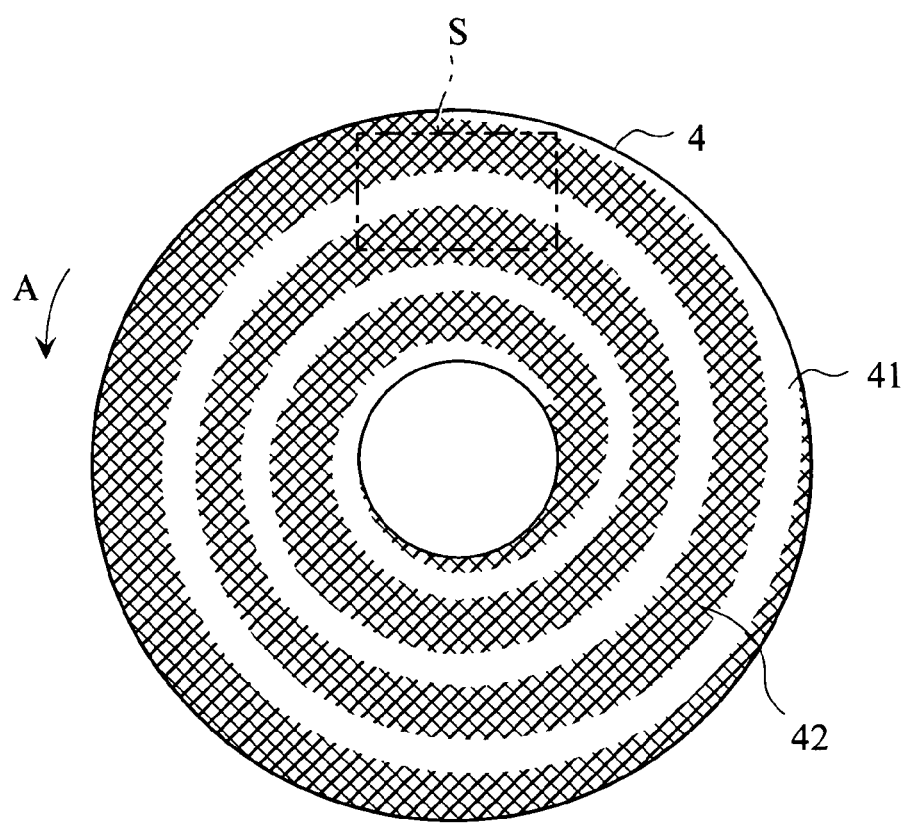
FIG. 9 is a front view showing a light scrolling disc, a portion, on which light is incident, of the light scrolling disc, and the direction of rotation of the light scrolling disc.
Figure 15:
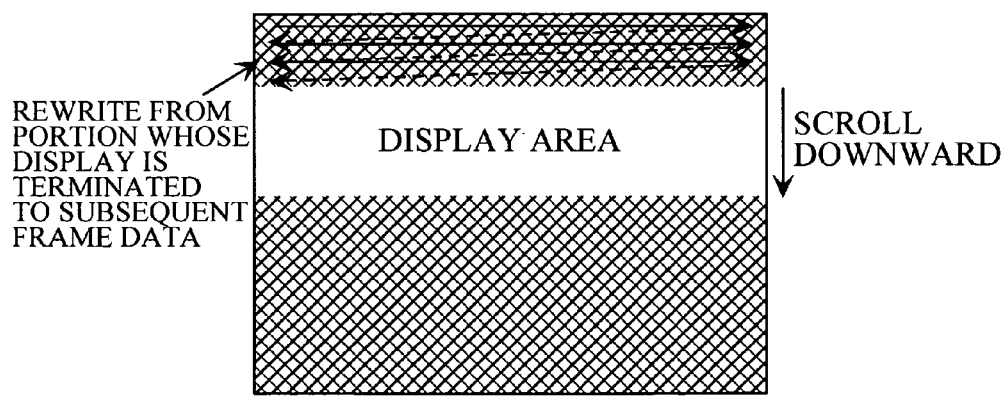
FIG. 15 is a schematic view showing the relationship between light scrolling and writing of pixel data.
Figure 18:
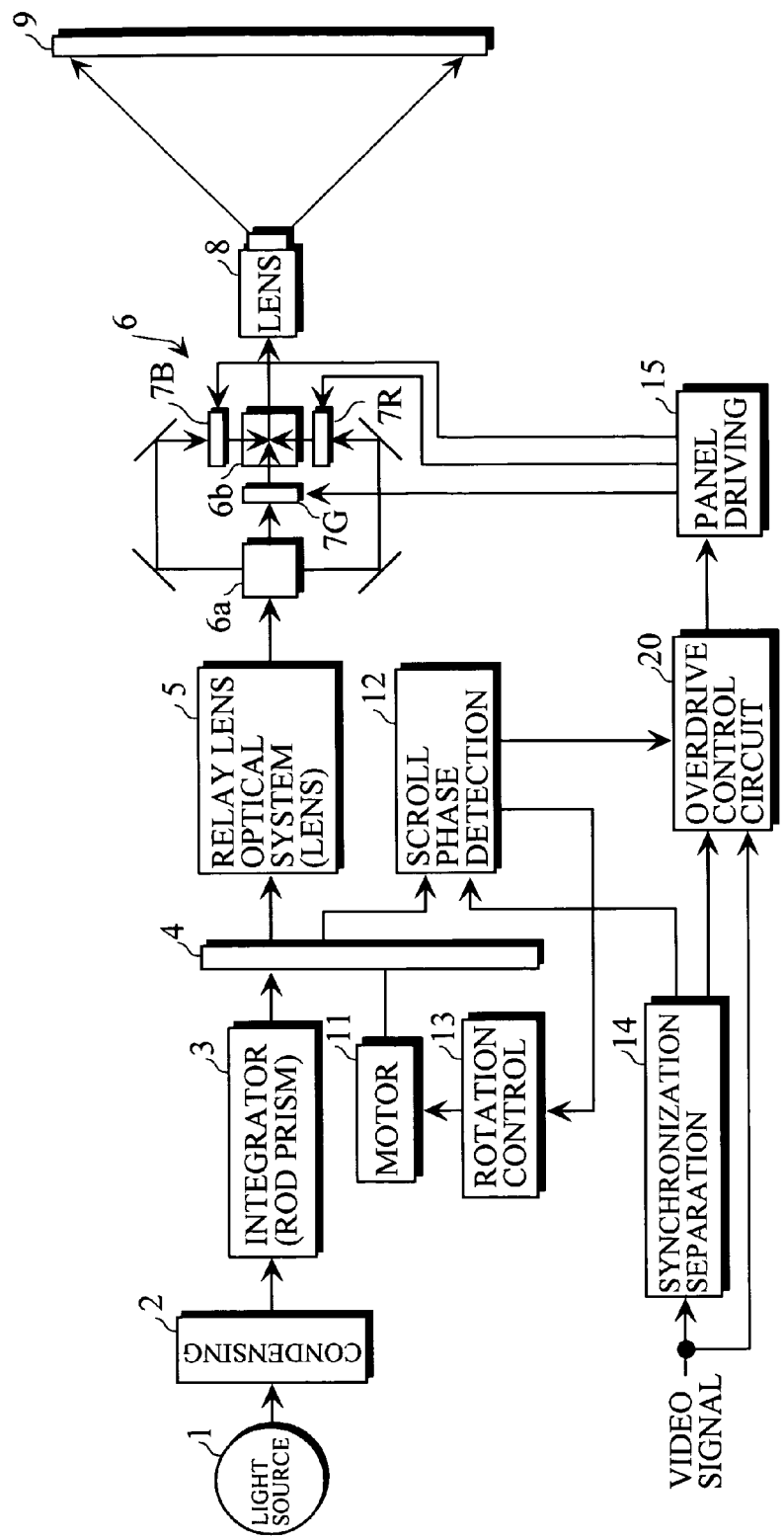
FIG. 18 is a block diagram showing the configuration of a second liquid crystal projector already developed by the applicant of the present invention.
Figure 19A:
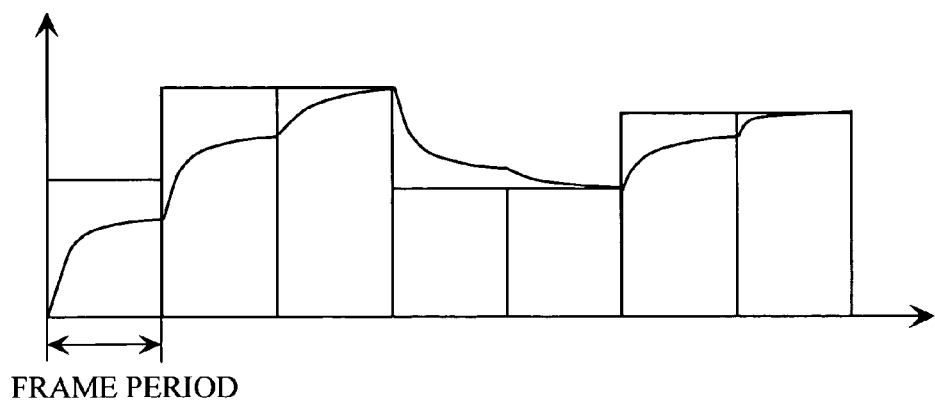
FIGS. 19a and 19b are graphs showing liquid crystal response in a case where overdrive control is not carried out and liquid crystal response in a case where overdrive control is carried out.
Figure 19B:
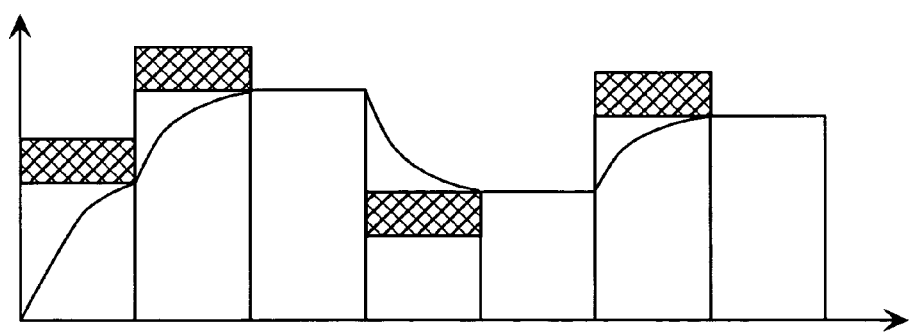
Figure 21:
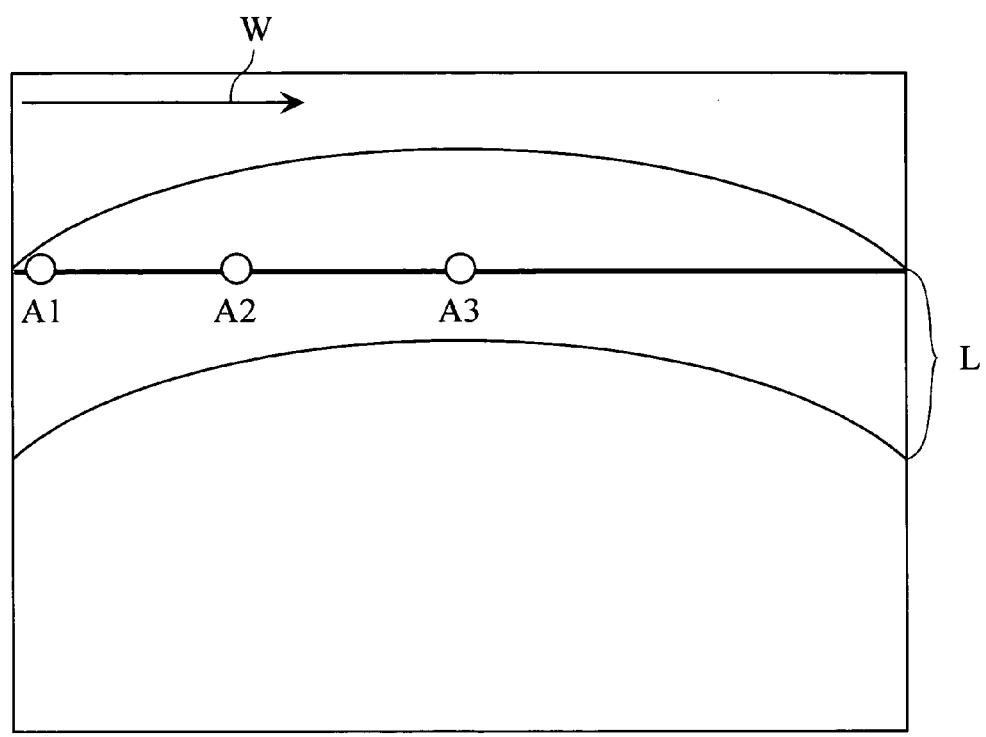
FIG. 21 is an enlarged schematic view showing light irradiated onto a liquid crystal display panel in a case where a light scrolling disc 4 is driven by a method shown in FIG. 9.

[1-1] Case of Projection Type Video Display Apparatus Such as Liquid Crystal Projector In a case where a light scrolling disc 4 is driven by the method described using FIG. 9, to scroll light irradiated onto a liquid crystal display panel in a liquid crystal projector shown in FIG. 18, the irradiated light L has a circular arc shape which is an inverted U shape, as shown in FIG. 21. The order in which data are written is the same as a direction indicated by an arrow in FIG. 15.

Figure 16:
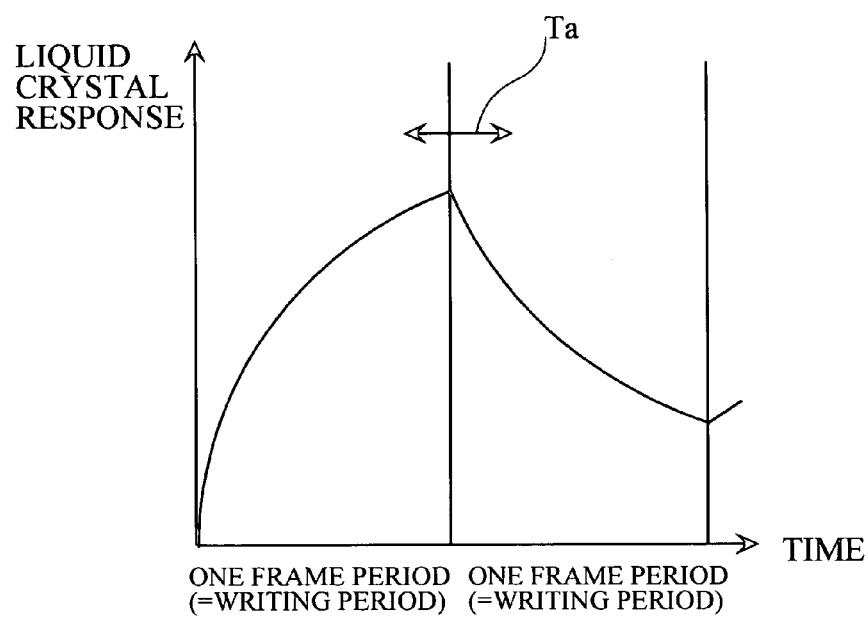
FIG. 16 is a graph showing the relationship between liquid crystal response and a light irradiation period.
Figure 17:
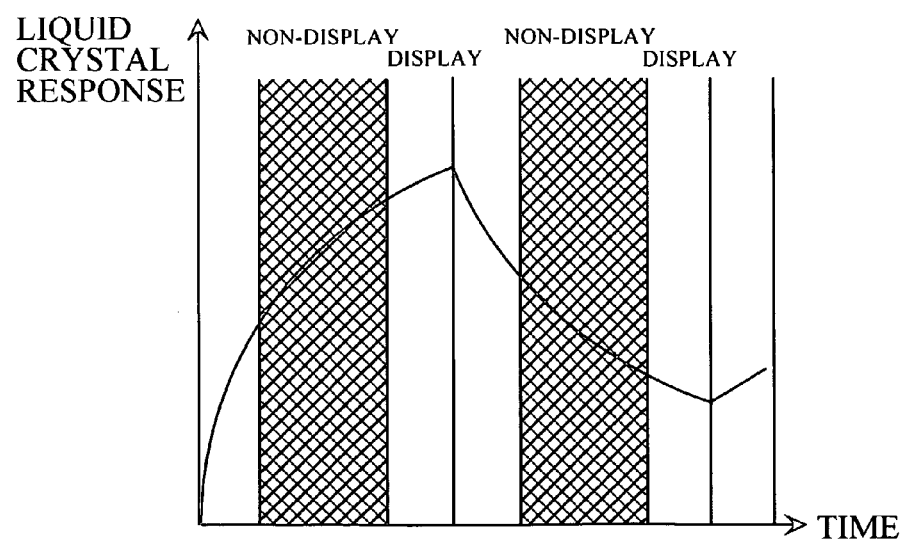
FIG. 17 is a graph showing the relationship between liquid crystal response and a light irradiation period.

A light irradiation period most suitable for liquid crystal response becomes a period indicated by Ta in FIG. 16. As shown in FIG. 22, when the timing of light irradiation is adjusted so as to be timing most suitable for the response of a liquid crystal of a pixel A3 at the center illustrated in FIG. 21, the farther a pixel is away from the pixel A3 in the horizontal direction, the earlier the timing of light irradiation becomes, as compared with the timing of light irradiation most suitable for the response of a liquid crystal of the pixel.

Therefore, the farther the pixel is away from the pixel A3, the more easily a double image is produced.

Figure 26A:
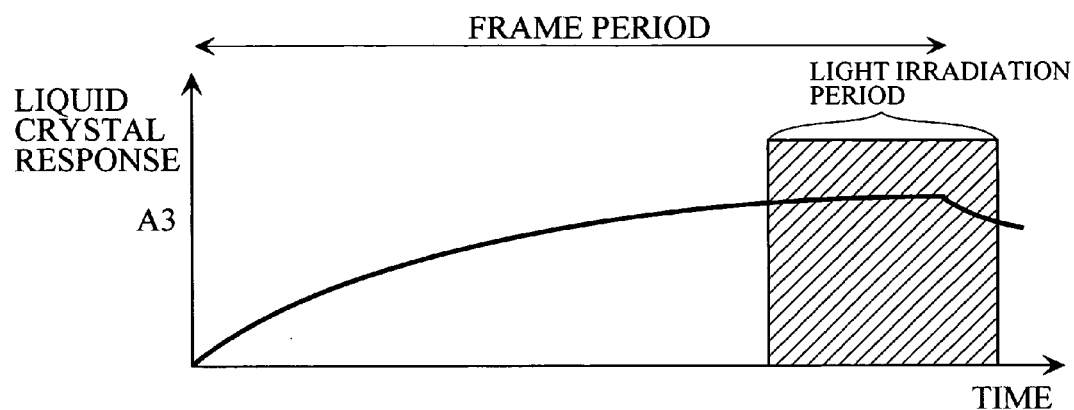
FIGS. 26a, 26b and 26c are graphs for explaining overdrive control (by-area overdrive control) in which the degree of emphasis of an input value is made higher than that in normal overdrive control.
Figure 26B:
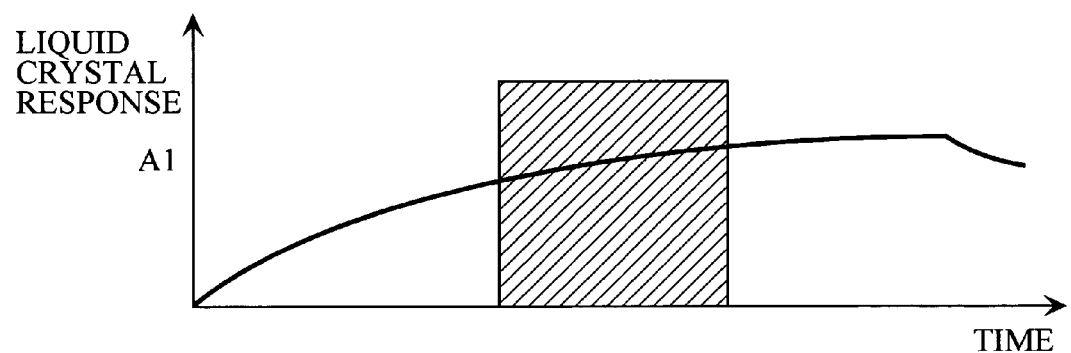
Figure 26C:
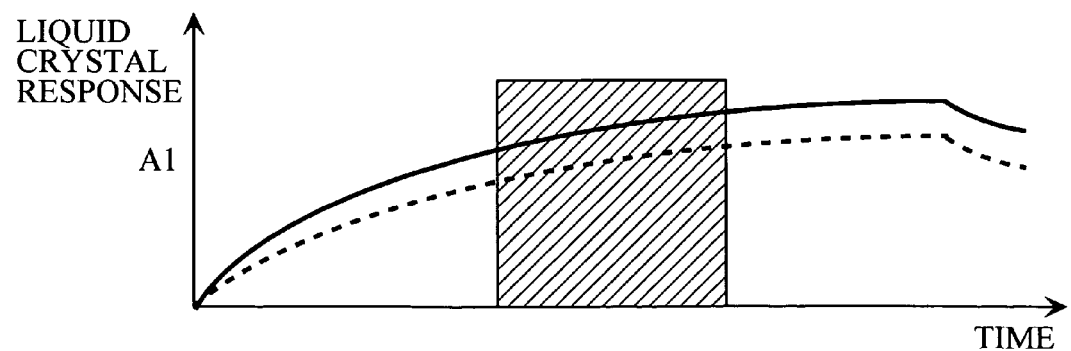

That is, assuming that the relationship between the response of the liquid crystal of the pixel A3 and the light irradiation period is a relationship as shown in FIG. 26a in a case where normal overdrive control is carried out, for example, the relationship between the response of a liquid crystal of a pixel A1 and a light irradiation period is a relationship as shown in FIG. 26b. In the present invention, therefore, overdrive control (by-area overdrive control) in which the degree of emphasis of an input value is made higher than that in the normal overdrive control is carried out such that the response of the liquid crystal of the pixel A1 becomes characteristics indicated by a solid line in FIG. 26c.

That is, overdrive control for emphasizing an input value which is carried out with respect to an input signal corresponding to an area at the center of the width of the liquid crystal display panel is taken as reference overdrive control, to carry out by-area overdrive control, in which the farther an area is away from the center of the width of the liquid crystal display panel in the horizontal direction, the higher the degree of emphasis of an input value is made, as compared with that in the reference overdrive control, with respect to an input signal corresponding to the area.

Figure 11:
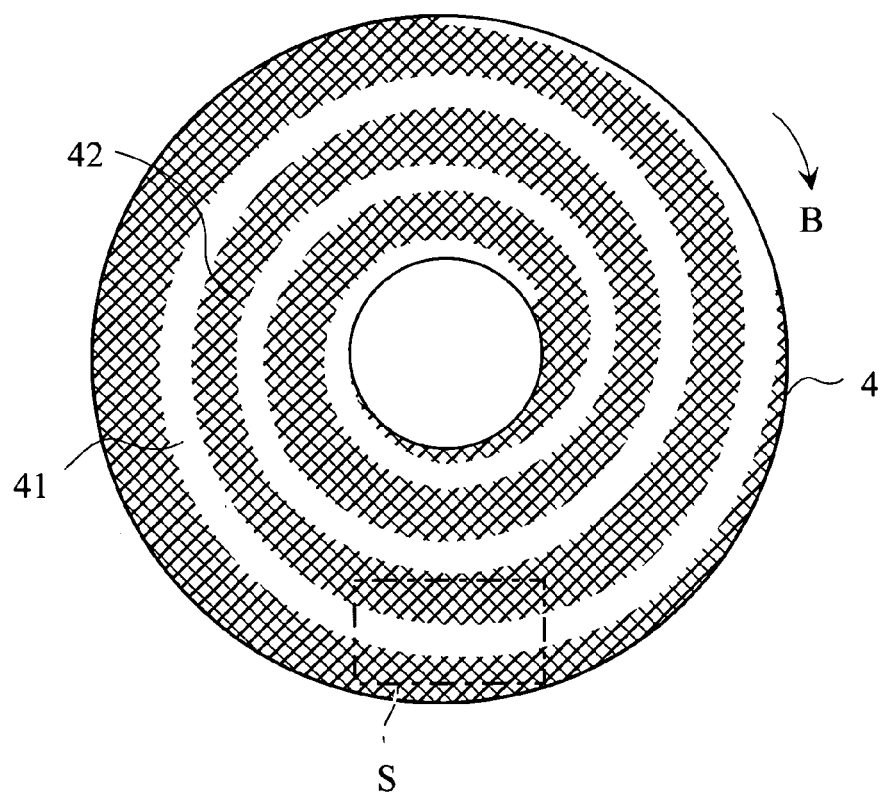
FIG. 11 is a front view showing a light scrolling disc, a portion, on which light is incident, of the light scrolling disc, and the direction of rotation of the light scrolling disc.
Figure 12:
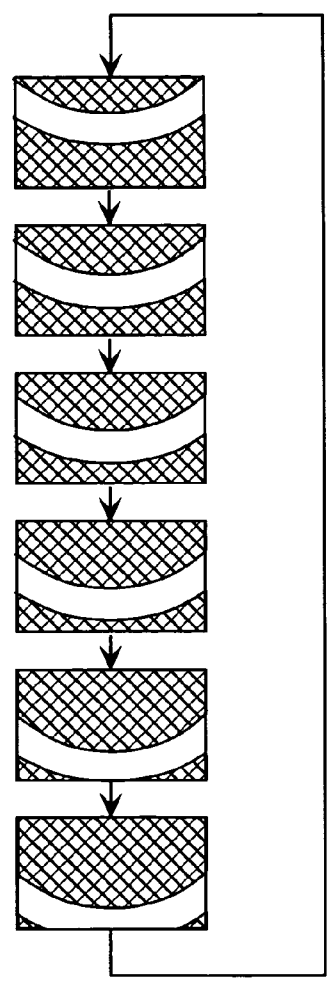
FIG. 12 is a schematic view showing a pattern of light irradiated onto a liquid crystal display panel in a case where a light scrolling disc is driven by a method shown in FIG. 10.
Figure 13A:
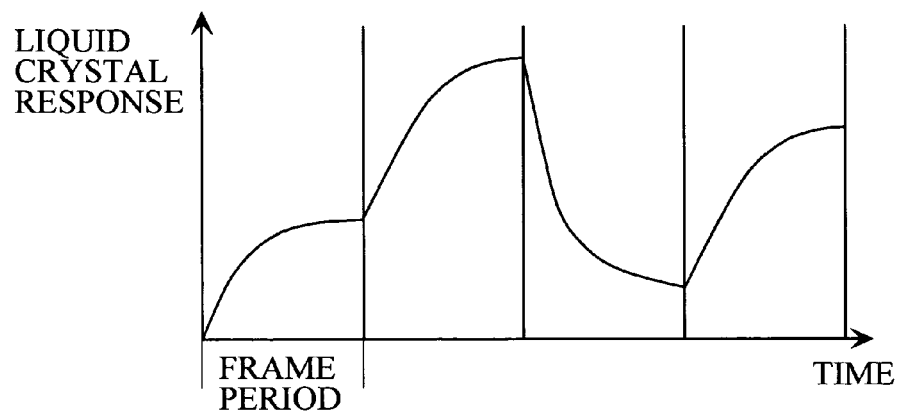
FIGS. 13a, 13b, and 13c are graphs showing the relationship between irradiated light by liquid crystal response and scrolling and display luminance.
Figure 13B:
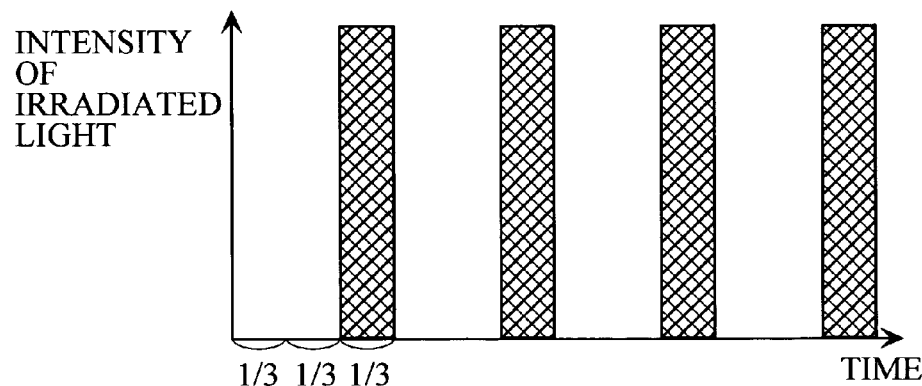
Figure 13C:
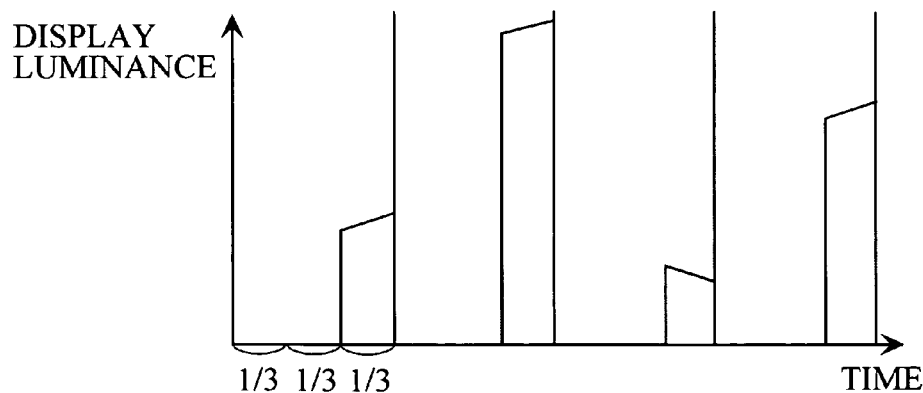
Figure 14:
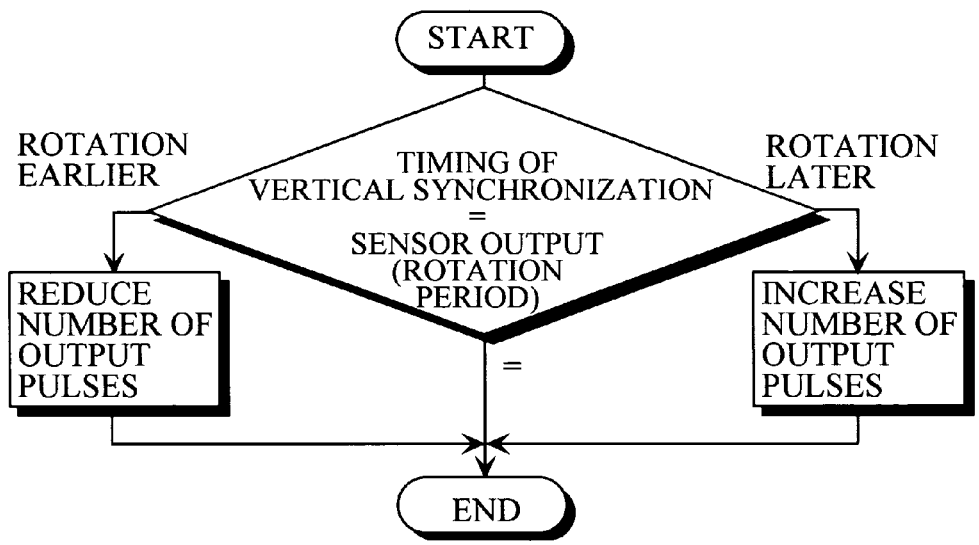
FIG. 14 is a flow chart showing that motor control is carried out by a video synchronizing signal and an output of a scrolling phase detection circuit.
Figure 27:
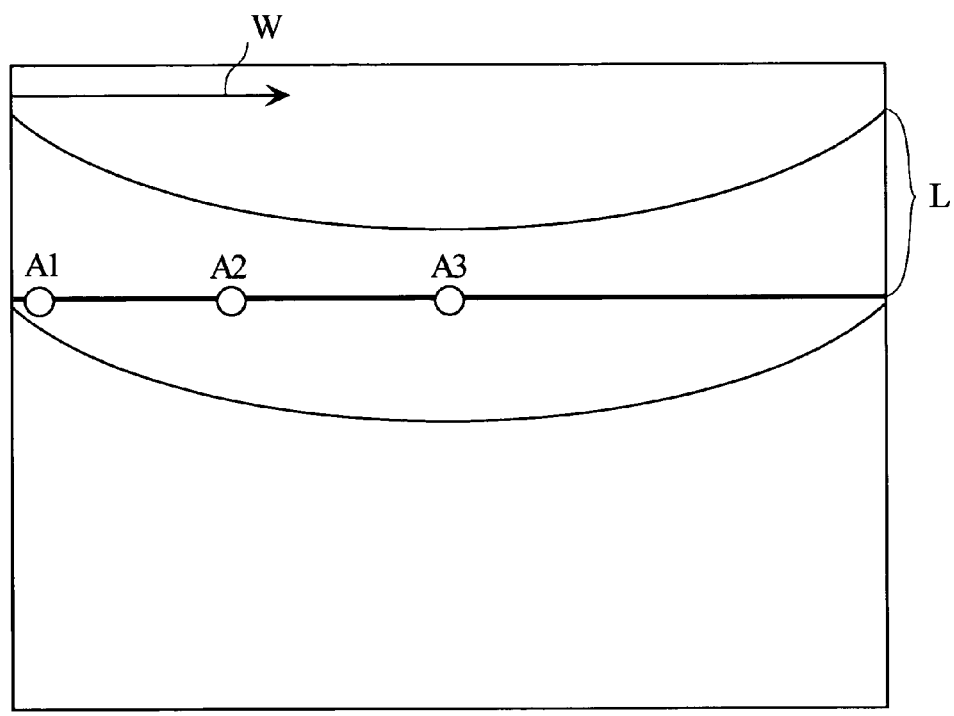
FIG. 27 is an enlarged schematic view showing light irradiated onto a liquid crystal display panel in a case where a light scrolling disc 4 is driven by a method shown in FIG. 11.

In a case where the light scrolling disc 4 is driven by the method described using FIG. 11, to scroll light irradiated onto the liquid crystal display panel in the liquid crystal projector shown in FIG. 18, the irradiated light L has a circular arc shape which is a U shape, as shown in FIG. 27. In this case, when the timing of light irradiation is adjusted so as to be timing most suitable for the response of a liquid crystal of a pixel A3 at the center, the farther a pixel is away from the pixel A3 in the horizontal direction, the earlier the timing of light irradiation becomes, as compared with the timing of light irradiation most suitable for the response of a liquid crystal of the pixel. In other words, liquid crystal response for the timing of light irradiation is too early.

In the overdrive control, however, liquid crystal response can be made earlier but cannot be made later. Therefore, the response of a liquid crystal of a pixel spaced apart from the pixel A3 cannot be suitably adjusted to the timing of light irradiation.

When the timing of light irradiation is adjusted so as to be timing most suitable for the response of a liquid crystal of a pixel A1 farther away from the center in FIG. 27 in the horizontal direction, therefore, the nearer a pixel is to the center of the width of the liquid crystal display panel, the earlier the timing of light irradiation becomes, as compared with the timing of light irradiation most suitable for the response of a liquid crystal of the pixel.

In this case, it is considered that overdrive control for emphasizing an input value which is carried out with respect to input signals corresponding to pixels positioned at both ends of the liquid crystal display panel is taken as reference overdrive control, to carry out by-area overdrive control, in which the nearer a pixel is to the center of the width of the liquid crystal display panel, the higher the degree of emphasis of an input value is made, as compared with that in the reference overdrive control, with respect to an input signal corresponding to the pixel. However, this method is not desirable because the image quality at the center of the liquid crystal display panel is more greatly sacrificed, as compared with the image quality in the periphery thereof.

From the foregoing, it is preferable that the light scrolling disc 4 is driven by the method described using FIG. 9. That is, the shape of the irradiated light is a circular arc shape which is an inverted U shape, and a pattern of the irradiated light is scrolled downward from the top of the liquid crystal display panel.

[1-2] Case of Direct-View Type Video Display Apparatus

Figure 23:
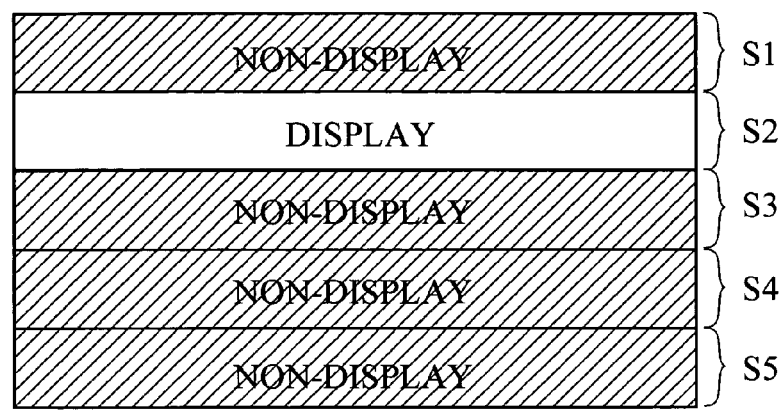
FIG. 23 is a schematic view showing that light from a backlight is circularly scrolled and irradiated for each of division areas on a liquid crystal display panel downward from the top thereof in a direct-view type video display apparatus.
Figure 24:
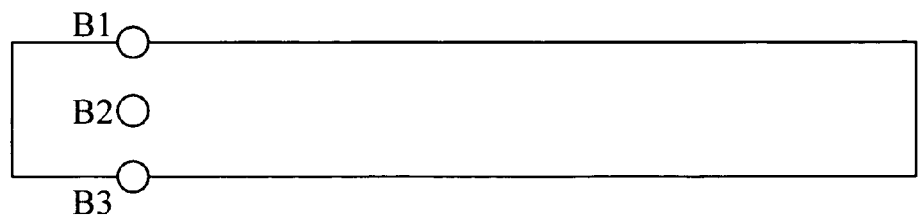
FIG. 24 is a schematic view showing pixels spaced apart from one another in the vertical direction in the division area on the liquid crystal display panel shown in FIG. 23.

In a direct-view type video display apparatus in which light from a backlight is circularly scrolled and irradiated for each of division areas on a liquid crystal display penal downward from the top thereof, as shown in FIG. 23, the respective timings of light irradiation onto pixels B1, B2, and B3 shown in FIG. 24 are the same, as described above. However, data are written into the pixels B1, B2, and B3 in this order, so that the timings at which the data are written into the pixels differ.

Figure 25:
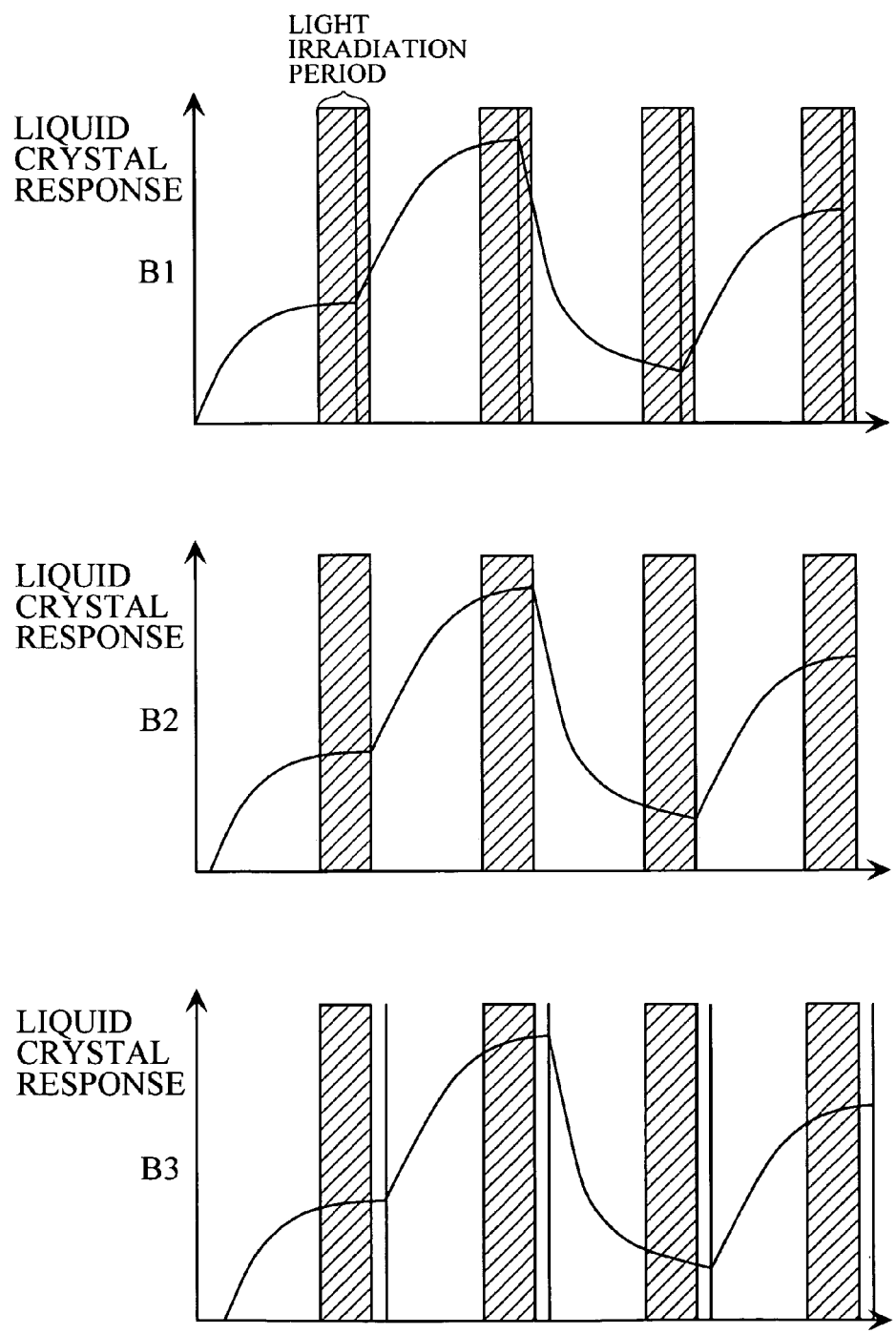
FIG. 25 is a schematic view showing that when the timing of light irradiation is adjusted so as to be timing most suitable for the response of a liquid crystal of a pixel B1, the farther a pixel is away from the pixel B1 in the vertical direction, the earlier the timing of light irradiation becomes, as compared with the timing of light irradiation most suitable for the response of a liquid crystal of the pixel.

As shown in FIG. 25, when the timing of light irradiation is adjusted so as to be timing most suitable for the response of a liquid crystal of a pixel B1, the farther a pixel is away from the pixel B1 in the vertical direction, the earlier the timing of light irradiation becomes, as compared with the timing of light irradiation most suitable for the response of a liquid crystal of the pixel. Therefore, the farther the pixel is away from the pixel B1 in the vertical direction, the more easily a double image is produced.

In the present invention, therefore, in each of the division areas on the liquid crystal display panel, overdrive control for emphasizing an input value which is carried out with respect to an input signal corresponding to an uppermost area in the division area is taken as reference overdrive control, to carry out by-area overdrive control, in which the farther an area is away from the uppermost area in the vertical direction in the division area, the higher the degree of emphasis of an input value is made, as compared with that in the reference overdrive control, with respect to an input signal corresponding to the area.

[2] Description of Embodiment

Figure 28:
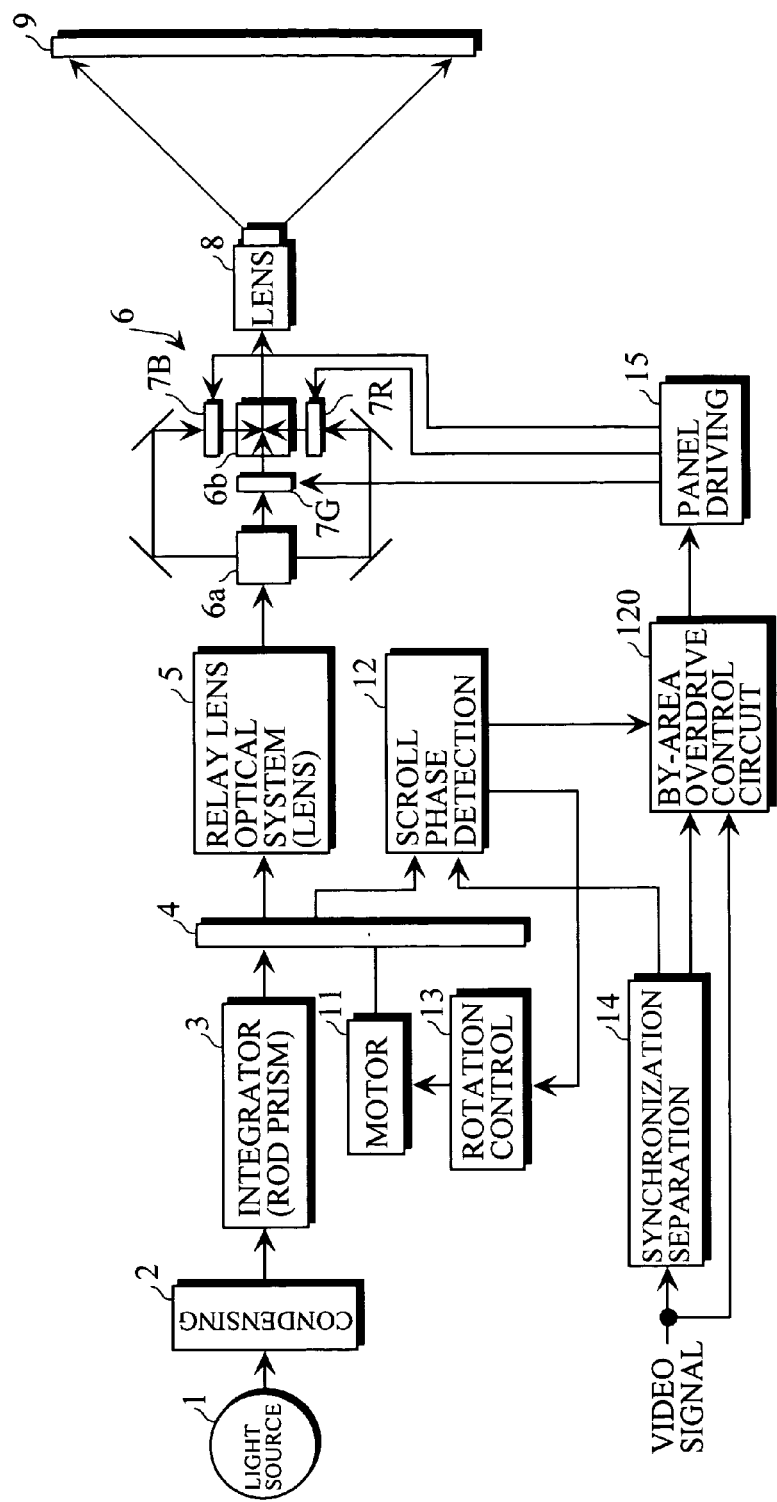
FIG. 28 is a block diagram showing an embodiment of the present invention.

FIG. 28 illustrates the configuration of a liquid crystal projector according to an embodiment of the present invention. In FIG. 28, the same units as those shown in FIG. 18 are assigned same reference numerals and hence, the description thereof is not repeated.

The liquid crystal projector shown in FIG. 28 differs from the liquid crystal projector shown in FIG. 18 in that a by-area overdrive control circuit 120 for carrying out by-area overdrive control which also considers the shape of a pattern of irradiated light is provided in place of the normal overdrive control circuit 20 shown in FIG. 18.

Figure 10:
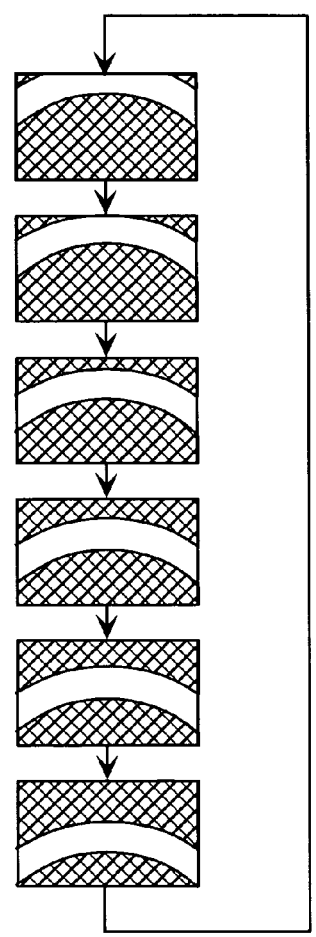
FIG. 10 is a schematic view showing a pattern of light irradiated onto a liquid crystal display panel in a case where a light scrolling disc is driven by a method shown in FIG. 9.

A light scrolling disc 4 is the same as that shown in FIG. 9, and is driven by the method described using FIG. 9. Consequently, the shape of light irradiated onto each of liquid crystal display panels 7R, 7G, and 7B becomes a circular arc shape which is an inverted U shape, and a pattern of the irradiated light is scrolled downward from the top of each of the liquid crystal display panels 7R, 7G, and 7B, as shown in FIG. 10.

Figure 29:
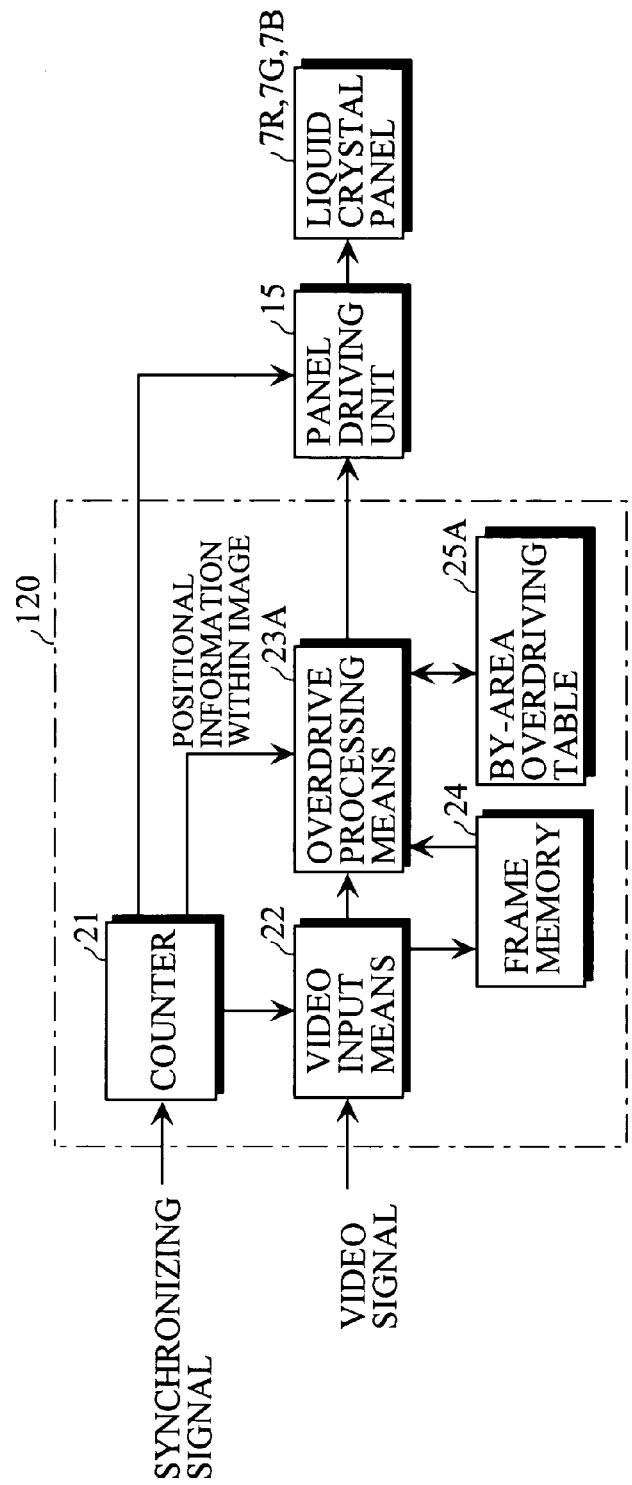
FIG. 29 is a block diagram showing the configuration of a by-area overdrive control circuit shown in FIG. 28.

FIG. 29 illustrates the configuration of the by-area overdrive control circuit 120. In FIG. 29, the same units as those shown in FIG. 20 are assigned same reference numerals and hence, the description thereof is not repeated.

Figure 20:
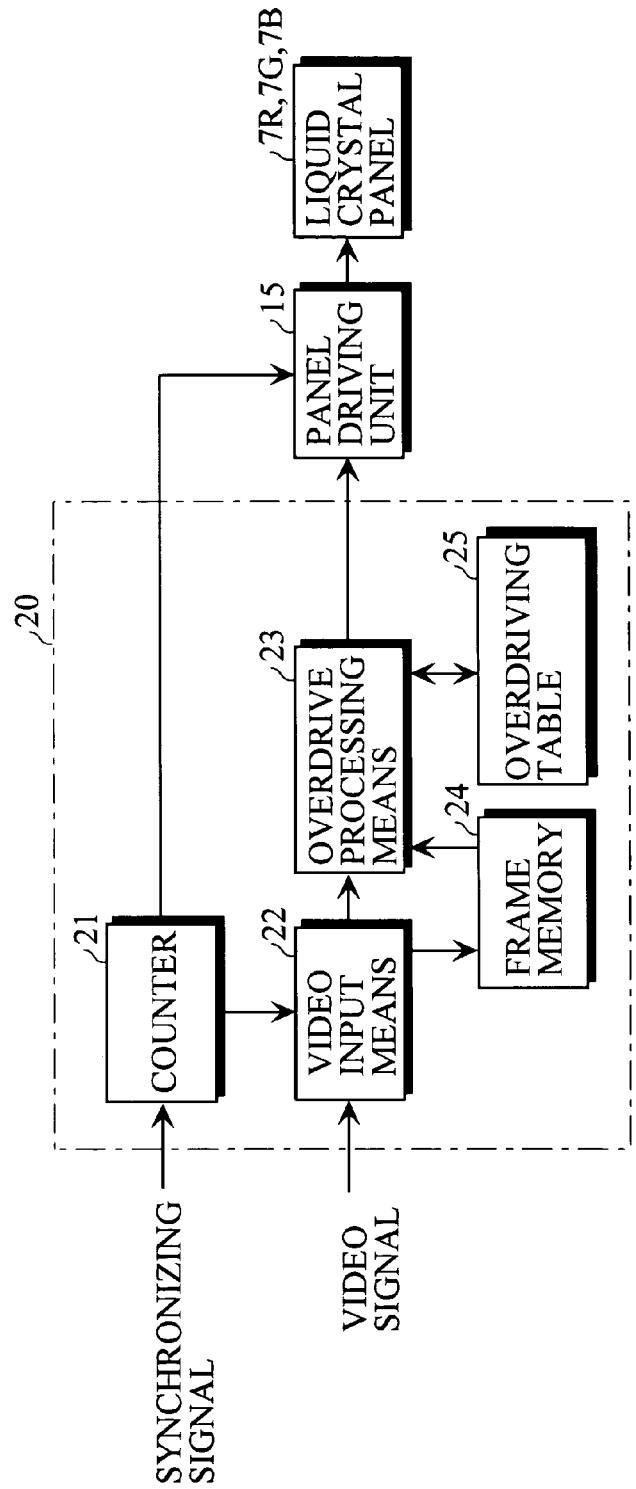
FIG. 20 is a block diagram showing the configuration of an overdrive control circuit shown in FIG. 18.

In the by-area overdrive control circuit 120 shown in FIG. 29, the operation of overdrive processing means 23A and the contents of a by-area overdriving table 25A differ from those in the overdrive control circuit 20 shown in FIG. 20.

Figure 30:
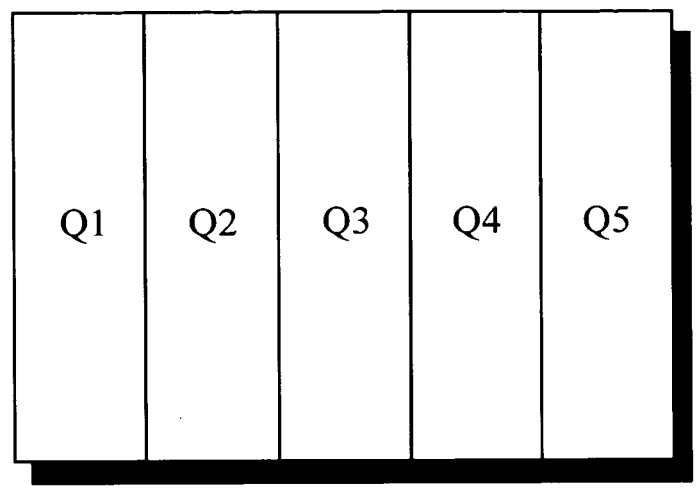
FIG. 30 is a schematic view showing a state where a liquid crystal display panel is divided into a plurality of division areas in the horizontal direction.

As shown in FIG. 30, a display panel area of a liquid crystal display panel is divided into a plurality of division areas Q1 to Q5 in the horizontal direction. An overdriving table which also considers the shape of a pattern of irradiated light is provided for each of the division areas in the by-area overdriving table 25A.

The overdriving table for each of the division areas holds, for each estimated combination of an input value in the current frame and an input value in the preceding frame, which correspond to the same pixel, an output value at which the input value in the current frame is emphasized. In the overdriving table corresponding to the division area Q3 positioned at the center of the width of the liquid crystal display panel, the same output value as that in the case of the normal overdrive control is set as the output value.

In each of the overdriving tabled corresponding to the division areas Q1, Q2, Q4, and Q5 at positions other than the center of the width of the liquid crystal display panel, an output value at which the degree of emphasis of the input value is made higher, as compared with that in the case of the normal overdrive control, is set as the output value. The farther the area to be an object is away from the center of the width of the liquid crystal display panel, the higher the degree of emphasis is made.

To the overdrive processing means 23A, information representing the position of a pixel corresponding to an input video signal is inputted from a counter 21. The overdrive processing means 23A reads, when a pixel value corresponding to a predetermined pixel is inputted from video input means 22, an input value in a frame which is one frame preceding the current frame, which corresponds to the pixel, from a frame memory 24.

On the basis of the input value in the preceding frame and an input value in the current frame, which correspond to the pixel, and information representing the position of the pixel which is inputted from the counter 21, an output value corresponding to the combination of the input values is read from the overdriving table, corresponding to the division area to which the position of the pixel belongs, in the by-area overdriving table 25A, and the obtained output value is outputted to a panel driving unit 15.

[3] Description of Modified Example of By-Area Overdrive Control Circuit 120

Figure 31:
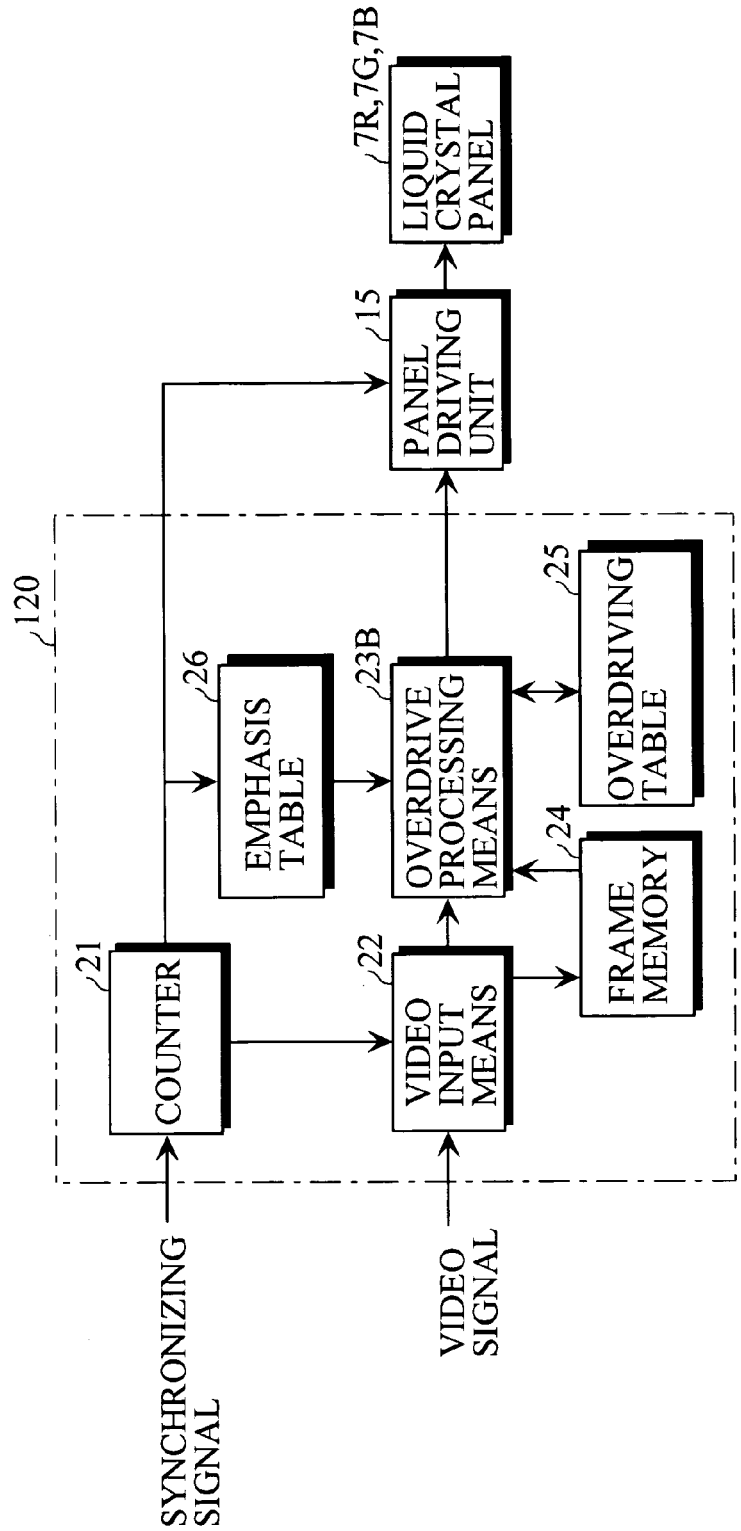
FIG. 31 is a block diagram showing a modified example of a by-area overdrive control circuit.

FIG. 31 illustrates a modified example of the by-area overdrive control circuit 120. In FIG. 31, the same units as those shown in FIG. 20 are assigned same reference numerals and hence, the description thereof is not repeated.

The by-area overdrive control circuit 120 shown in FIG. 31 differs from the overdrive control circuit 20 shown in FIG. 20 in that an emphasis table 26 is provided and in the operation of overdrive processing means 23B. The contents of an overdriving table 25 are the same as those of the overdriving table 25 in the overdrive control circuit 20 shown in FIG. 20.

As shown in FIG. 30, a display panel area of a liquid crystal display panel is divided into a plurality of division areas Q1 to Q5 in the horizontal direction. The emphasis table 26 stores, for each of the division areas, the degree to which an output value read out of the overdriving table 25 is emphasized (the degree of emphasis)×[%] in consideration of the shape of a pattern of irradiated light. The degree of emphasis x for each of the division areas Q1 to Q5 is so set that the farther an area is away from the center of the width of the liquid crystal display panel, the higher the degree of emphasis x becomes.

To the emphasis table 26, information representing the position of a pixel corresponding to an input video signal is inputted from a counter 21. The emphasis table 26 reads out, on the basis of the information representing the position of the pixel inputted from the counter 21, a degree of emphasis x corresponding to a division area Q1 to which the position of the pixel corresponding to the input video signal belongs, and sends the read degree of emphasis x to the overdrive processing means 23B.

The overdrive processing means 23B reads, when a pixel value corresponding to a predetermined pixel is inputted from video input means 22, an input value in a frame which is one frame preceding the current frame, which corresponds to the pixel, from a frame memory 24. On the basis of the input value in the preceding frame and an input value in the current frame, which correspond to the pixel, the direction of the change in the input value (positive or negative) is then judged, and an output value corresponding to a combination of the input values is read from the overdriving table 25.

If the direction of the change in the input value is positive (in a case where the input value in the current frame is not less than the input value in the preceding frame), letting x be the degree of emphasis obtained from the emphasis table 26, the output value read from the overdriving table 25 is multiplied by $\{1+(x/100)\}$, and the result of the multiplication is outputted as an output value to the panel driving unit 15. If the direction of the change in the input value is negative (in a case where the input value in the current frame is smaller than the input value in the preceding frame), letting x be the degree of emphasis obtained from the emphasis table 26, the output value read from the overdriving table 25 is multiplied by $\{1-(x/100)\}$, and the result of the multiplication is outputted as an output value to the panel driving unit 15.

[4] Application to Direct-View Type Video Display Apparatus

In the by-area overdrive control circuit 120 (FIGS. 29 and 31) described in the above-mentioned embodiment, it is possible to carry out stronger overdrive control, as compared with the normal overdrive control, depending on an area on the liquid crystal display panel.

As to the direct-view type video display apparatus in which light from the backlight is circularly scrolled and irradiated for each of division areas on the liquid crystal display panel downward from the top thereof, as already described using FIGS. 23, 24, and 25 in the above-mentioned item [1–2], in each of division areas S1 to S5 (see FIG. 23) on the liquid crystal display panel, overdrive control for emphasizing an input value which is carried out with respect to an input signal corresponding to an uppermost area in the division area may be taken as reference overdrive control, to carry out by-area overdrive control, in which the farther an area is away from the uppermost area in the vertical direction in the division area, the higher the degree of emphasis of an input value is made, as compared with that in the reference overdrive control, with respect to an input signal corresponding to the area.

Such control can be carried out by changing the contents of the by-area overdriving table 25A in the by-area overdrive control circuit 120 shown in FIG. 29, while changing the contents of the emphasis table 26 in the by-area overdrive control circuit 120 shown in FIG. 31.

Figure 32:
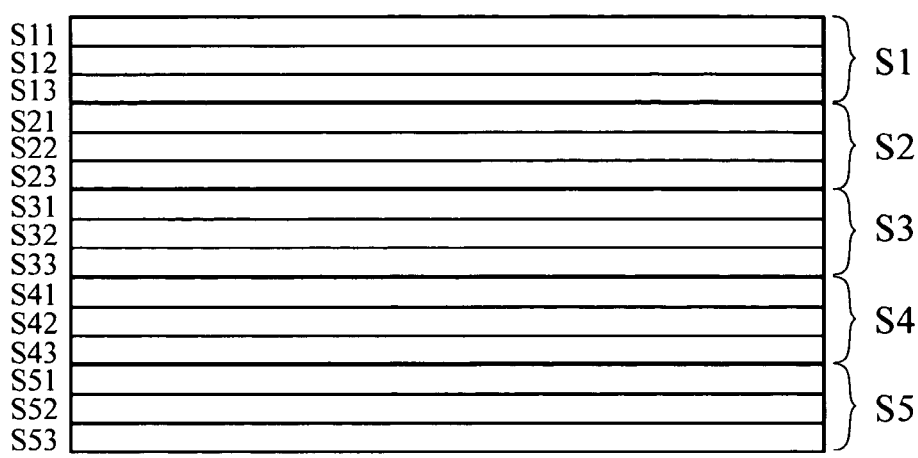
FIG. 32 is a schematic view showing, in a direct-view type video display apparatus in which light from a backlight is circularly scrolled and irradiated for each of division areas on a liquid crystal display panel downward from the top thereof, a state where the division area is further divided into small areas.

That is, the division areas S1 to S5 corresponding to the backlight on the liquid crystal display panel are further divided, respectively, into a plurality of small areas S11 to S13, S21 to S23, S31 to S33, S41 to S43, and S51 to S53 in the vertical direction, as shown in FIG. 32.

In a case where the by-area overdrive control circuit 120 shown in FIG. 29 is applied, an overdriving table is provided for each of the small areas S11 to S53 in the by-area overdriving table 25A. In this case, in the overdriving table corresponding to the small area S11 in the uppermost stage in each of the division areas S1 to S5, the same output value as that in the case of the normal overdrive control is set as an output value. In each of the overdriving tables corresponding to the small areas S12 and S13 in the intermediate and lower stages, for example, in each of the division areas S1 to S5, an output value at which the degree of emphasis of an input value is made higher than that in the case of the normal overdrive control is set as an output value.

In a case where the by-area overdrive control circuit 120 shown in FIG. 31 is applied, the degree to which an output value read out of the overdriving table 25 is emphasized (the degree of emphasis)×[%] is stored for each of the small areas S11 to S53 in the emphasis table 26. In this case, the degree of emphasis x is so set as to increase toward the small area on the lowermost side in each of the division areas S1 to S5.

In the direct-view type video display apparatus, there is a method of subdividing a backlight in the direction of scrolling, to smooth the scrolling of a light source in order to reduce the above-mentioned double image. As this method, the number of fluorescent tubes for the backlight may be increased, for example. In this method, however, the number of wirings becomes enormous, and a driving circuit and a control circuit increase in scale, thereby making it impossible to avoid a substantial increase in manufacturing costs.

By using the method according to the present invention, smooth display of a moving image in which a double image is hardly produced even in the construction of a backlight the number of divisions of which is small, thereby leading to a reduction in costs.

Even when a backlight is constructed using an LED, a double image can be reduced if a flashing period is controlled for each device. However, this leads to a substantial increase in costs. In an LED of such a type that a large area is realized, a method of reducing costs by molding a plurality of devices is used. Accordingly, a unit for scrolling a backlight on a liquid crystal display TV or the like has a predetermined width. Therefore, the same idea as that in the case of the fluorescent tube is applicable to the conditions of overdrive. The present invention is also effective in the backlight using the LED.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. In a projection type video display apparatus comprising light deflection means for circularly scrolling and irradiating irradiated light with a pattern having a circular arc shape which is an inverted U shape in a direction, perpendicular to the line direction, in which the writing of data progresses on a hold-type display panel, a projection type video display apparatus comprising
by-area overdrive control means for taking overdrive control for emphasizing an input value which is carried out with respect to an input signal corresponding to an area at the center of the width of the hold-type display panel as reference overdrive control, to carry out by-area overdrive control, in which the farther an area is away from the center of the width of the hold-type display panel in the horizontal direction, the higher the degree of emphasis of an input value is made, as compared with that in the reference overdrive control, with respect to an input signal corresponding to the area.

2. In a direct-view type video display apparatus comprising a hold-type display panel divided into a plurality of division areas in the vertical direction, a backlight is provided for each of the division areas, and ON/OFF of the backlight is controlled, so that light from the backlight is circularly scrolled and irradiated in a vertical direction, in which the writing of data progresses, for each of the division areas on the hold-type display panel, a direct-view type video display apparatus comprising
by-area overdrive control means for taking, in each of the division areas on the hold-type display panel, overdrive control for emphasizing an input value which is carried out with respect to an input signal corresponding to an uppermost area in the division area as reference overdrive control, to carry out by-area overdrive control, in which the farther an area is away from the uppermost area in the vertical direction in the division area, the higher the degree of emphasis of an input value is made, as compared with that in the reference overdrive control, with respect to an input signal corresponding to the area.

3. In a light deflection device in a projection type video display apparatus, a light deflection device in a projection type video display apparatus comprising:
a light scrolling disc arranged on an optical path of emitted projection; and
a driving device for rotating the light scrolling disc around its center,
the light scrolling disc comprising a spiral-shaped light transmission portion for transmitting light of all colors and a light interruption portion for interrupting light of all colors,
the position where the emitted light from the light source for projection is inputted to the light scrolling disc and the direction of rotation of the light scrolling disc being determined such that the shape of light passing through the light transmission portion in the light scrolling disc is a pattern in a circular arc shape which is an inverted U shape, and light with the pattern is circularly scrolled in a direction, perpendicular to the line direction, in which the writing of data progresses on a hold-type display panel.

4. A projection type video display apparatus comprising;
a light deflection device for deflecting light emitted from a light source for project
color separation means for separating the light deflected by the light deflection device into red light, green light and blue light,
three liquid crystal panels for modulating the light of each color obtained by the color separation means, and
color synthesizing means for synthesizing video light obtained from each of the liquid crystal panels,
the light deflection device comprising a light scrolling disc arranged on an optical path of the emitted light from the light source for projection, and a driving device for rotating the light scrolling disc around its center,
the light scrolling disc comprising a spiral-shaped light transmission portion for transmitting light of all colors and a light interruption portion for interrupting light of all colors, and
the position where the emitted light from the light source for projection is inputted to the light scrolling disc and the direction of rotation of the light scrolling disc being determined such that the shape of light passing through the light transmission portion in the light scrolling disc is a pattern in a circular arc shape which is an inverted U shape, and light with the pattern is circularly scrolled in a direction, perpendicular to the line direction, in which the writing of data progresses on a hold-type display panel.

* * * * *